United States Patent
Sato

(10) Patent No.: US 9,904,053 B2
(45) Date of Patent: Feb. 27, 2018

(54) DISPLAY DEVICE, AND METHOD OF CONTROLLING DISPLAY DEVICE

(71) Applicant: SEIKO EPSON CORPORATION, Tokyo (JP)

(72) Inventor: Shinya Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 6 days.

(21) Appl. No.: 14/956,868

(22) Filed: Dec. 2, 2015

(65) Prior Publication Data

US 2016/0187662 A1 Jun. 30, 2016

(30) Foreign Application Priority Data

Dec. 25, 2014 (JP) ................................. 2014-261729
Oct. 1, 2015 (JP) ................................. 2015-195599

(51) Int. Cl.
*G02B 27/01* (2006.01)

(52) U.S. Cl.
CPC .... *G02B 27/017* (2013.01); *G02B 2027/0187* (2013.01)

(58) Field of Classification Search
CPC .............. G02B 27/017; G02B 2027/0187
See application file for complete search history.

(56) References Cited

U.S. PATENT DOCUMENTS

| | | | |
|---|---|---|---|
| 6,369,952 B1* | 4/2002 | Rallison | G02B 27/017 359/630 |
| 9,448,687 B1* | 9/2016 | McKenzie | G06F 3/0481 |
| 2013/0141421 A1* | 6/2013 | Mount | H04N 21/41407 345/419 |
| 2013/0235169 A1 | 9/2013 | Kato et al. | |
| 2014/0104142 A1* | 4/2014 | Bickerstaff | G02B 27/017 345/8 |
| 2014/0104143 A1* | 4/2014 | Benson | G02B 27/017 345/8 |
| 2014/0176609 A1* | 6/2014 | Gotoda | G02B 27/017 345/633 |

FOREIGN PATENT DOCUMENTS

WO 2012/172719 A1 12/2012

* cited by examiner

*Primary Examiner* — Kumar Patel
*Assistant Examiner* — Amy C Onyekaba
(74) *Attorney, Agent, or Firm* — Oliff PLC

(57) ABSTRACT

A head-mounted type display device includes an image display unit that is mounted on the head of a user to display an image, and is capable of transmitting an external landscape, a nine-axis sensor and a head side sensor which detect a relative position of the image display unit to the head of the user. An AR display control unit of the head-mounted type display device adjusts a display position of an object that is displayed on the image display unit on the basis of a detection result of the nine-axis sensor and the head side sensor.

4 Claims, 10 Drawing Sheets

DISPLAY DEVICE, AND METHOD OF CONTROLLING DISPLAY DEVICE

BACKGROUND

1. Technical Field

The present invention relates to a display device, and a method of controlling the display device.

2. Related Art

In the related art, there is known a display device called a head mounted display (HMD) that is used in a state of being mounted on the head by a user. In this type of display device, when a mounting position deviates from a standard position, there is a problem in that it is difficult to visually recognize an image that is displayed. Therefore, in the related art, there is suggested a method of imaging an inner corner of an eye and the eyeball of the user with a camera to measure a position of the inner corner or an outer corner of the eye with respect to a display, thereby detecting a positional deviation of the display (for example, refer to International Publication No. 2012/172719).

SUMMARY

As a first problem, in the above-described configuration of the related art, it is necessary to provide position detecting equipment such as a camera that images the inner corner of an eye or the eyeball of the user, and a marker that is adhered to the HMD. According to this, complication of a device configuration is caused, and thus there is a problem in that a high workload for position detection is given to the user.

As a second problem, an area of the HMD on a side which faces the user is limited, and thus in the above-described configuration of the related art, it is necessary to provide a light source, a camera, and an interconnection therefore on a portion having the limited area. In addition, it is necessary for the light source or the camera to be disposed at a position capable of illuminating and imaging the inner corner or the outer corner of an eye. The restrictions on the configuration may obstruct miniaturization or downsizing and thinning of a frame body or a structure body that constitutes a frame of the HMD.

An advantage of some aspects of the invention is to realize a configuration, in which a user can view an image in a preferred state, with a simple device configuration in a display device that is mounted on the head of the user.

Another advantage of some aspects of the invention is to provide a configuration capable of being miniaturized in the display device that is to be mounted on the head of the user.

A display device according to an aspect of the invention includes a display unit that is mounted on the head of a user to display an image, and is capable of transmitting an external landscape, a detection unit that detects a relative position of the display unit to the head of the user, and a position adjustment unit that adjusts a display position of an object that is displayed on the display unit on the basis of a detection result of the detection unit.

According to the aspect of the invention, in a simple device configuration, the display position is adjusted in correspondence with the relative position of the display unit to the head of the user. According to this, it is possible to display an object at an appropriate position, and thus the user can view an image at a preferable state.

The display device may further include a control unit that obtains the amount of variation in the relative position of the display unit to the head of the user from reference time that is set on the basis of the detection result of the detection unit.

According to the aspect of the invention with this configuration, the variation in the relative position of the display unit to the head of the user can be obtained as a variation amount from the reference time, and thus it is possible to easily perform display adjustment corresponding to the variation in the relative position, and the like.

In the display device, the control unit may set the reference time in a state in which the display position of the object that is displayed on the display unit is adjusted.

According to the aspect of the invention with this configuration, it is possible to easily adjust the display position of the object in correspondence with the variation in the relative position of the display unit to the head of the user.

In the display device, the detection unit may include a sensor that detects movement or posture of the display unit, and the detection unit may detect the relative position of the display unit to the head of the user on the basis of an output of the sensor, and an output of an auxiliary sensor that is provided to the head of the user to detect movement or posture of the head.

According to the aspect of the invention with this configuration, it is possible to detect the variation in the relative position of the display unit to the head of the user with a simple configuration.

In the display device, the detection unit may include a pressure sensor that detects a pressure between a display unit main body that supports the display unit, and the head of the user.

According to the aspect of the invention with this configuration, it is possible to detect the variation in the relative position of the display unit to the head of the user with a simple configuration.

In the display device, the detection unit may include a magnetic sensor, and the detection unit may detect the relative position of the display unit to the head of the user on the basis of a result when the magnetic sensor detects a magnetic substance that is disposed on the head of the user.

According to the aspect of the invention with this configuration, it is possible to detect the variation in the relative position of the display unit to the head of the user with a simple configuration using the magnetic sensor.

In the display device, the detection unit may include a magnetic substance, and the detection unit may detect the relative position of the display unit to the head of the user on the basis of a result when a magnetic sensor disposed on the head of the user detects the magnetic substance.

According to the aspect of the invention with this configuration, it is possible to detect the variation in the relative position of the display unit to the head of the user with a simple configuration using the magnetic sensor.

A method of controlling a display device according to another aspect of the invention includes controlling the display device including a display unit that is mounted on the head of a user to display an image and is capable of transmitting an external landscape, and a detection unit that detects a relative position of the display unit to the head of the user, and adjusting a display position of an object that is displayed on the display unit on the basis of a detection result of the detection unit.

According to the aspect of the invention, the object display position is adjusted in correspondence with the relative position of the display unit to the head of the user, and thus the user can view an image in a preferable state.

The invention may be configured as a program executed by a computer that controls a display device including a display unit that is mounted on the head of a user to display an image and is capable of transmitting an external landscape, and a detection unit that detects a relative position of the display unit to the head of the user. The program adjusts a display position of an object that is displayed on the display unit on the basis of a detection result of the detection unit.

The invention may be configured as a recording medium that stores the program.

When the computer executes the program, the display device adjusts an object display position in correspondence with the relative position of the display unit to the head of the user, and thus the user can view an image in a preferable state.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
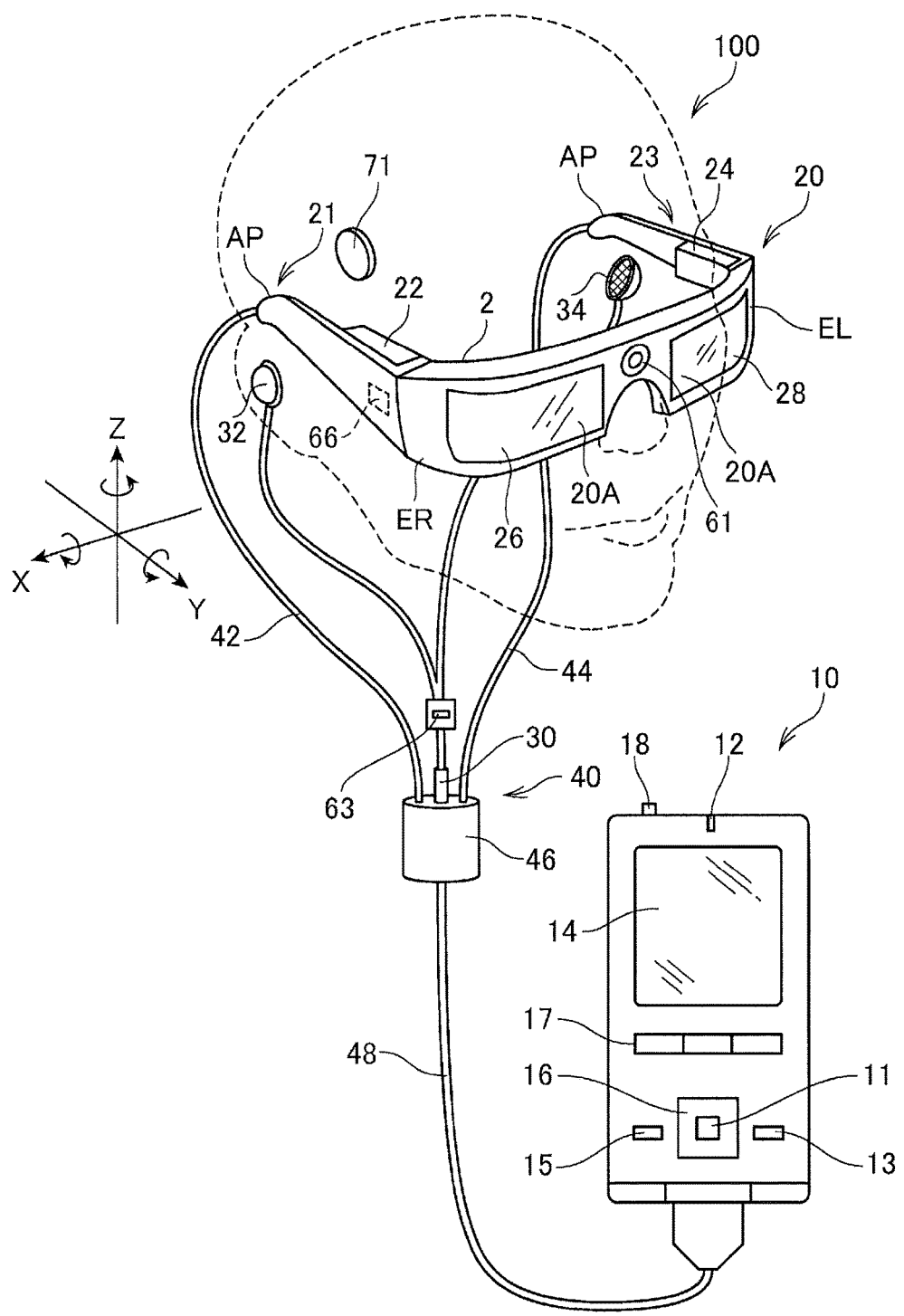
FIG. 1 is a view illustrating an external appearance configuration of a head-mounted type display device according to a first embodiment.

FIG. 1 is a view illustrating an external appearance configuration of a head-mounted type display device 100 (display device) according to an embodiment to which the invention is applied.

The head-mounted type display device 100 includes an image display unit 20 (display unit) that allows a user to visually recognize a virtual image in a state of being mounted on the head of the user, and a control device 10 that controls the image display unit 20. The control device 10 also functions as a controller that is used by a user to operate the head-mounted type display device 100.

The image display unit 20 is a mounted body that is to be mounted on the head of the user, and includes an eyeglass-shaped frame 2 (display unit main body) in this embodiment. The frame 2 supports the image display unit 20 as the display unit. The frame 2 includes a right holding unit 21 and a left holding unit 23. The right holding unit 21 is a member provided to extend from an end ER that is the other end of a right optical image display unit 26 over a position corresponding to the temporal region of the user when the image display unit 20 is mounted on the user. Similarly, the left holding unit 23 is a member provided to extend from an end EL that is the other end of a left optical image display unit 28 over a position corresponding to the temporal region of the user when the image display unit 20 is mounted on the user. The right holding unit 21 comes into contact with the right ear or the vicinity thereof on the head of the user, and the left holding unit 23 comes into contact with the left ear or the vicinity thereof of the user, thereby holding the image display unit 20 on the head of the user.

In the frame 2, the right holding unit 21, a right display drive unit 22, the left holding unit 23, a left display drive unit 24, the right optical image display unit 26, the left optical image display unit 28, a camera 61 (imaging unit), and a microphone 63 are provided.

The right optical image display unit 26 and the left optical image display unit 28 are disposed to be positioned in front of the right eye and the left eye of the user, respectively, when the image display unit 20 is mounted on the user. One end of the right optical image display unit 26 and one end of the left optical image display unit 28 are connected to each other at a position corresponding to the brow of the user when the image display unit 20 is mounted on the user.

The right holding unit 21 is a member provided to extend from the end ER that is the other end of the right optical image display unit 26 over a position corresponding to the temporal region of the user when the image display unit 20 is mounted on the user. Similarly, the left holding unit 23 is a member provided to extend from the end EL that is the other end of the left optical image display unit 28 over a position corresponding to the temporal region of the user when the image display unit 20 is mounted on the user. The right holding unit 21 and the left holding unit 23 holds the image display unit 20 to the head of the user similar to a temple (bow) of eyeglasses.

The right display drive unit 22 and the left display drive unit 24 are disposed on a side that faces the head of the user when the image display unit 20 is mounted on the user. In addition, the right display drive unit 22 and the left display drive unit 24 are collectively and simply referred to as "display drive unit", and the right optical image display unit 26 and the left optical image display unit 28 are collectively and simply referred to as "optical image display unit".

Each of the right display drive units 22 and 24 includes each of liquid crystal displays 241 and 242 (hereinafter, referred to as "LCDs 241 and 242"), each of projection optical systems 251 and 252 to be described later with reference to FIG. 3, and the like.

Each of the right optical image display unit 26 and the left optical image display unit 28 includes each of light guiding plates 261 and 262 (FIG. 2), and a dimming plate 20A. The light guiding plates 261 and 262 are formed from a light-transmitting resin and the like, and guide image light output from the display drive units 22 and 24 to the eyes of a user. The dimming plate 20A is a thin plate-shaped optical element, and is disposed to cover a front side of the image display unit 20 which is opposite to an eye side of the user. As the dimming plate 20A, it is possible to use various members such as a member having substantially no light-transmitting properties, a member that is close to transparency, a member that attenuates the amount of light and transmits light, and a member that attenuates or reflects light with a specific wavelength. When appropriately selecting optical characteristics (light transmittance and the like) of the dimming plate 20A, the amount of outside light, which is incident to the right optical image display unit 26 and the left optical image display unit 28 from an outer side, is adjusted, and thus it is possible to adjust easiness of visual recognition of a virtual image. In this embodiment, description will be given of a case of using the dimming plate 20A having at least light-transmitting properties with which the user, on which the head-mounted type display device 100 is mounted, can visually recognize an external landscape. The dimming plate 20A protects the right light guiding plate 261 and the left light guiding plate 262, thereby suppressing damage of the right light guiding plate 261 and the left light guiding plate 262, attachment of foreign matter thereto, and the like.

The dimming plate 20A may be configured to be detachable from the right optical image display unit 26 and the left optical image display unit 28. In addition, a plurality of kinds of the dimming plates 20A may be mounted in a replaceable manner. The dimming plate 20A may be omitted.

The camera 61 is disposed at a boundary line portion between the right optical image display unit 26 and the left optical image display unit 28. In a state in which the image display unit 20 is mounted on the user, the position of the camera 61 is approximately the center between both eyes of the user in a horizontal direction, and is over the both eyes of the user in a vertical direction. The camera 61 is a digital camera including an imaging element such as a CCD and CMOS, an imaging lens, and the like, and may be a monocular camera, or a stereo camera.

The camera 61 images at least a part of an external landscape in a front side direction of the head-mounted type display device 100, in other words, a visual field direction of the user in a state in which the head-mounted type display device 100 is mounted. An area of an angle of view in the camera 61 can be appropriately set, but it is preferable that an imaging range of the camera 61 is a range including the outside that is visually recognized by the user through the right optical image display unit 26 and the left optical image display unit 28. In addition, it is more preferable that the imaging range of the camera 61 is set to image the entirety of the visual field of the user through the dimming plate 20A.

The camera 61 performs image capturing in accordance with control of an imaging processing unit 161 (FIG. 3) that is provided to a control unit 140, and outputs captured image data to the imaging processing unit 161.

Figure 2:
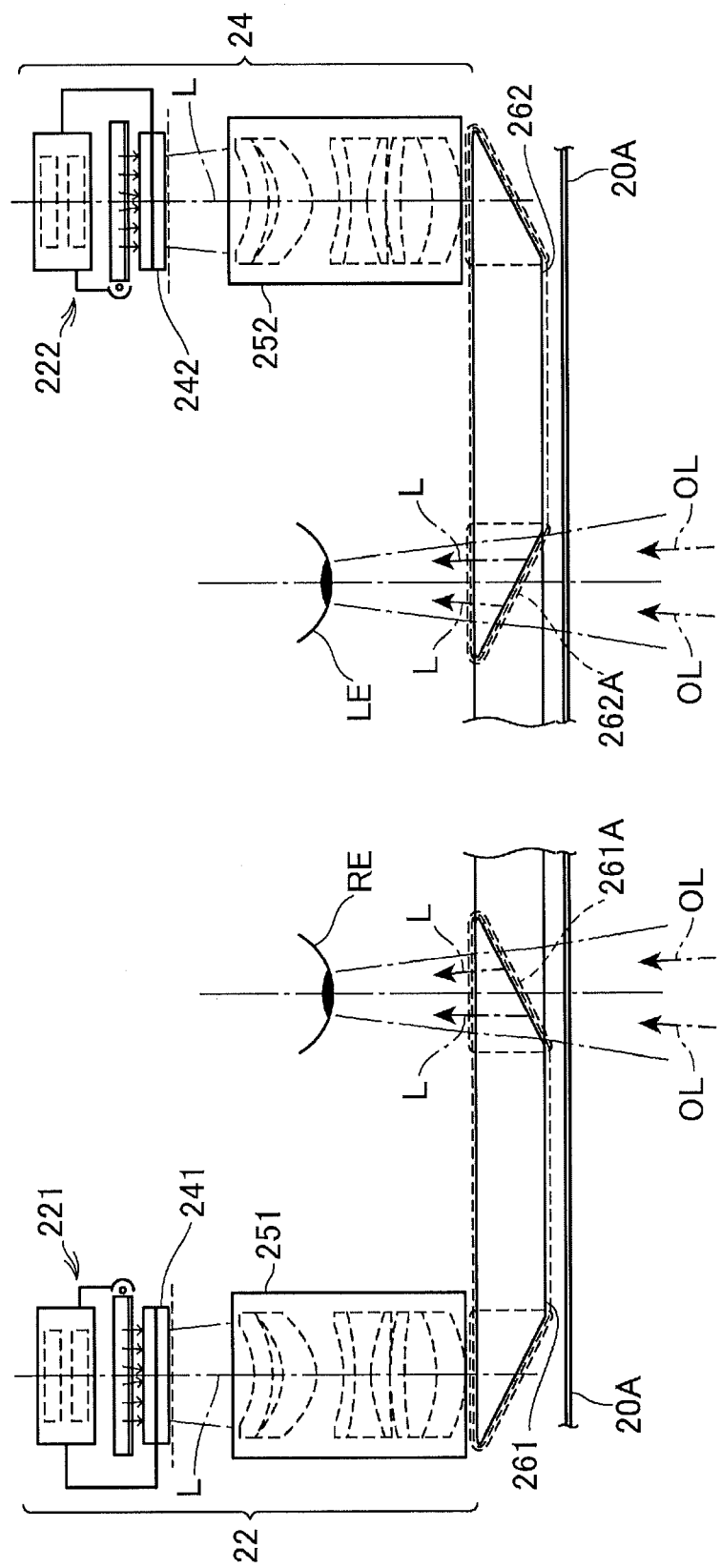
FIG. 2 is a view illustrating a configuration of an optical system of an image display unit.

FIG. 2 is a plan view of a main unit which illustrates a configuration of an optical system provided to the image display unit 20. In FIG. 2, the left eye LE and the right eye RE of the user are illustrated for explanation.

The left display drive unit 24 includes a left backlight 222, the left LCD 242, and the left projection optical system 252. The left backlight 222 includes a light source such as an LED and a diffusion plate. The left LCD 242 is a transmissive liquid crystal panel which is disposed on an optical path of light emitted from the diffusion plate of the left backlight 222, and in which a plurality of pixels are disposed in a matrix shape. The left projection optical system 252 includes a lens group that guides image light L that is transmitted through the left LCD 242, and the like.

The left projection optical system 252 includes a collimate lens that converts the image light L emitted from the left LCD 242 into a parallel light beam. The image light L, which is converted into the parallel light beam by the collimate lens, is incident to the left light guiding plate 262. The left light guiding plate 262 is a prism in which a plurality of reflective surfaces which reflect the image light L are formed, and the image light L is guided to the left eye LE side after a plurality of times of reflection at the inside of the left light guiding plate 262. A half mirror 262A, which is located in front of the left eye LE, is formed in the left light guiding plate 262.

The image light L, which is reflected from the half mirror 262A, is emitted from the left optical image display unit 28 toward the left eye LE, and the image light L forms an image on the retina of the left eye LE to allow the user to visually recognize the image.

The right display drive unit 22 has a configuration that is horizontally symmetrical to the left display drive unit 24. The right display drive unit 22 includes a right backlight 221, a right LCD 241, and a right projection optical system 251. The right backlight 221 includes a light source such as an LED and a diffusion plate. The right LCD 241 is a transmissive liquid crystal panel which is disposed on an optical path of light emitted from the diffusion plate of the right backlight 221, and in which a plurality of pixels are disposed in a matrix shape. The right projection optical system 251 includes a lens group that guides image light L that is transmitted through the right LCD 241, and the like.

The right projection optical system 251 includes a collimate lens that converts the image light L emitted from the right LCD 241 into a parallel light beam. The image light L, which is converted into the parallel light beam by the collimate lens, is incident to the right light guiding plate 261. The right light guiding plate 261 is a prism in which a plurality of reflective surfaces which reflect the image light L are formed, and the image light L is guided to the right eye RE side through a plurality of times of reflection at the inside of the right light guiding plate 261. A half mirror 261A, which is located in front of the right eye RE, is formed in the right light guiding plate 261.

The image light L, which is reflected from the half mirror 261A, is emitted from the right optical image display unit 26 toward the right eye RE, and the image light L forms an image on the retina of the right eye RE to allow the user to visually recognize the image.

The image light L that is reflected from the half mirror 261A and outside light OL that is transmitted through the dimming plate 20A are incident to the right eye RE of the user. The image light L that is reflected from the half mirror 262A and outside light OL that is transmitted through the dimming plate 20A are incident to the left eye LE. As described above, the head-mounted type display device 100 allows the image light L processed on an inner side, and the outside light OL to be incident to the eyes of the user in an overlapping state, and the user can view an external landscape or scene through the dimming plate 20A, and can visually recognize the image formed by the image light L in a state in which the image and the external landscape overlap each other. In this manner, the head-mounted type display device 100 also functions as a see-through-type display device.

In addition, the left projection optical system 252 and the left light guiding plate 262 are collectively referred to as "left light guiding unit", and the right projection optical system 251 and the right light guiding plate 261 are collectively referred to as "right light guiding unit". The configuration of the right light guiding unit and the left light guiding unit is not limited to the above-described example, and can use an arbitrary type as long as a virtual image can be formed in front of the eyes of the user by using the image light. For example, a diffraction lattice may be used, or a transflective film may be used.

The image display unit 20 is connected to the control device 10 through a connection unit 40. The connection unit 40 includes a main body cord 48 that is connected to the control device 10, a right cord 42, a left cord 44, and a connection member 46. The right cord 42 and the left cord 44 are cords which are diverged into two pieces from the main body cord 48. The right cord 42 is inserted into a casing of the right holding unit 21 from a tip end AP of the right holding unit 21 in an extension direction thereof, and is connected to the right display drive unit 22. Similarly, the left cord 44 is inserted into a casing of the left holding unit 23 from a tip end AP of the left holding unit 23 in an extension direction thereof, and is connected to the left display drive unit 24.

The connection member 46 is provided at a diverging point of the main body cord 48, the right cord 42, and the left cord 44, and includes a jack for connection of an earphone plug 30. A right earphone 32 and a left earphone 34 extend from the earphone plug 30. The microphone 63 is provided in the vicinity of the earphone plug 30. A portion from the earphone plug 30 to the microphone 63 is collected as one cord, and the cord is diverged from the microphone 63, and diverged portions are connected to the right earphone 32 and the left earphone 34, respectively.

Figure 3:
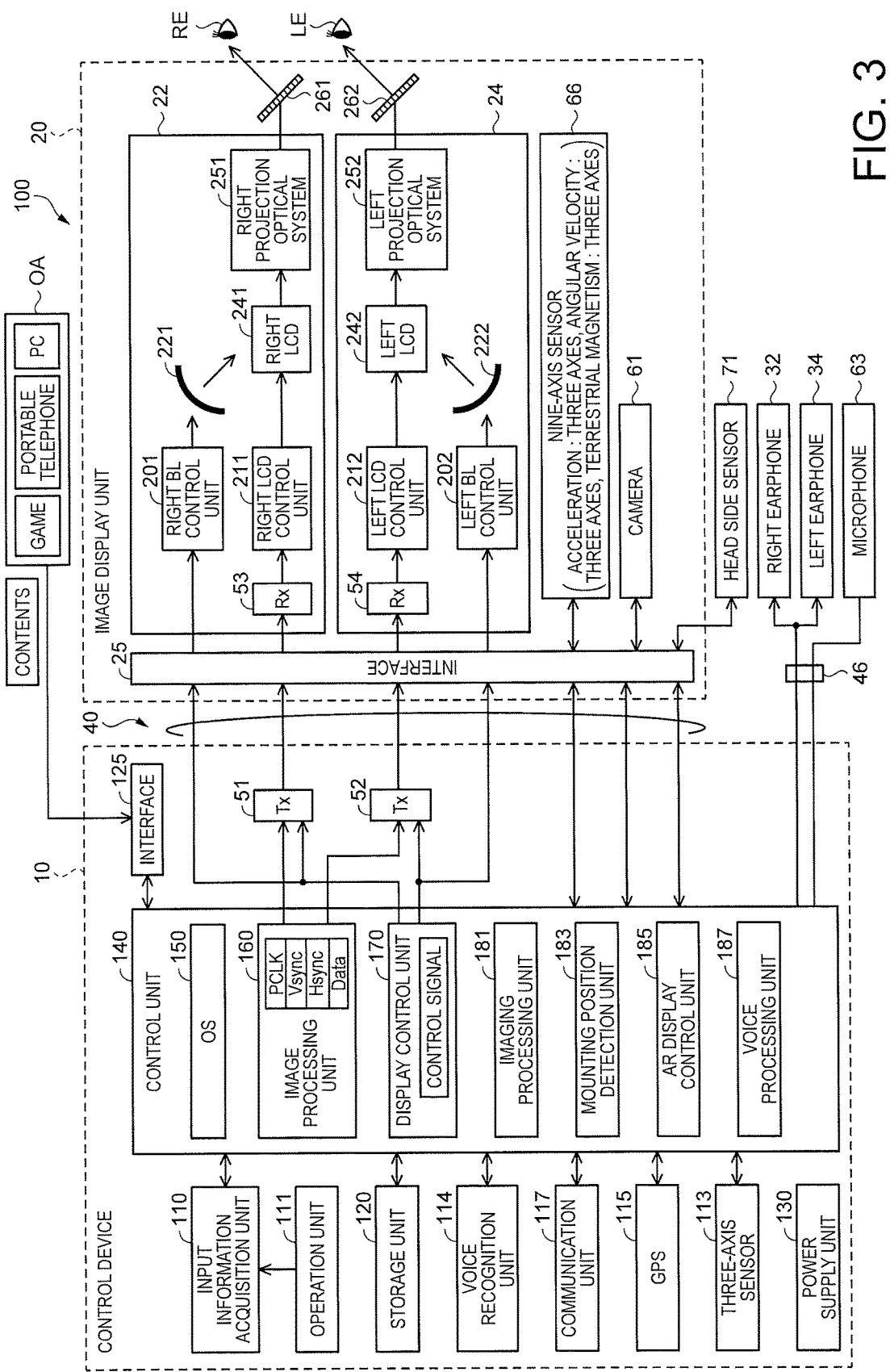
FIG. 3 is a functional block diagram of respective units which constitute the head-mounted type display device of the first embodiment.

In the microphone 63, for example, as illustrated in FIG. 1, a sound collection unit of the microphone 63 is disposed to face a visual line direction of the user to collect a voice, and outputs a voice signal to a voice processing unit 187 (FIG. 3). For example, the microphone 63 may be a monaural microphone, a stereo microphone, a microphone having directivity, or a microphone with no directivity.

The right cord 42, the left cord 44, and the main body cord 48 may be cords capable of transmitting digital data, and can be constituted by, for example, a metal cable or optical fiber. In addition, the right cord 42 and the left cord 44 may be collected with one cord.

The image display unit 20 and the control device 10 transmit various signals through the connection unit 40. Connectors (not illustrated), which are fitted to each other, are provided to an end of the main body cord 48 on a side opposite to the connection member 46, and the control device 10, respectively. The control device 10 and the image display unit 20 can be connected to each other or separated from each other by fitting the connector of the main body cord 48 and the connector of the control device 10 in each other, or by releasing the fitting.

The control device 10 controls the head-mounted type display device 100. The control device 10 includes a determination key 11, a lighting unit 12, a display switching key 13, a luminance switching key 15, a direction key 16, a menu key 17, and switches such as a power switch 18. In addition, the control device 10 includes a track pad 14 that is operated by the user with a finger thereof.

The determination key 11 detects a pressing operation, and outputs a signal that determines the content operated by the control device 10. The lighting unit 12 includes a light source such as a light emitting diode (LED), and makes a notification of an operation state (for example, power ON/OFF) of the head-mounted type display device 100 by using a lighting state of the light source. For example, the display switching key 13 outputs a signal, which gives an instruction of display mode switching of an image, in accordance with a pressing operation.

The track pad 14 includes an operation surface that detects a contact operation, and outputs an operation signal in accordance with an operation with respect to the operation surface. A detection type on the operation surface is not limited, and an electrostatic type, a pressure detection type, an optical type, and the like can be employed. The luminance switching key 15 outputs a signal that gives an instruction of an increase or a decrease in the luminance of the image display unit 20 in accordance with a pressing operation. The direction key 16 outputs an operation signal in accordance with a key pressing operation corresponding to upper and lower directions and right and left directions. The power switch 18 is a switch that switches power ON/OFF of the head-mounted type display device 100.

In addition, as illustrated in FIG. 1, the head-mounted type display device 100 is configured to cooperate with a head side sensor 71 (auxiliary sensor) that is mounted on the head of the user. In this specification, a device including the head-mounted type display device 100 and the head side sensor 71 may be described as "display system" except for a particularly stated case. The head side sensor 71 is an inertial sensor that is directly or indirectly fixed to the head of the user, and detects movement of the head of the user or pose of the head of the user. Specifically, the head side sensor 71 is directly fixed to the head or hair of the user with a member (not illustrated) such as a belt, a string, a hair fixing pin, and an adhesive, or is fixed to a body, which is mounted on the head, such as a cap, a helmet, and the left and right earphones 32 and 34. The head side sensor 71 can be configured as an acceleration sensor, or an angular velocity (gyro) sensor. The head side sensor 71 of this embodiment is set as a three-axis gyro sensor.

The head side sensor 71 and the image display unit 20 are freely displaceable from each other. The head side sensor 71 of this embodiment is configured as an independent member from the image display unit 20, and is not connected to the image display unit 20, and thus the image display unit 20 is displaceable without limitation to the position of the head side sensor 71. The head side sensor 71 may be configured to be connected to the image display unit 20. For example, the head side sensor 71 and the image display unit 20 may be connected to each other with a wire or a string for prevention of missing of the head side sensor 71, or may be connected to each other with a cable for electrical connection thereof. Even in this case, it is preferable to employ a configuration in which the image display unit 20 is freely displaceable with respect to the head side sensor 71.

A nine-axis sensor 66 (sensor) is embedded in the frame 2. As described later, the nine-axis sensor 66 is a unit in which an acceleration sensor, a magnetic sensor, and an angular velocity sensor are embedded. As illustrated in FIG. 1, the nine-axis sensor 66 is embedded in the right holding unit 21 corresponding to a temple of eyeglasses. The nine-axis sensor 66 is fixed to the frame 2, and thus in a case where displacement of the frame 2 occurs, movement thereof and the pose of the frame 2 are detected by the nine-axis sensor 66. The position of the nine-axis sensor 66 is not limited to the right holding unit 21 of the frame 2. The nine-axis sensor 66 may be disposed not to be displaced from the frame 2, and the position of the nine-axis sensor 66 is set in an arbitrary manner.

At a measurement reference point of a detection mechanism that is embedded, the head side sensor 71 detects rotation (pitching) around an X axis, rotation (yawing) around a Y axis, and rotation (rolling) around a Z axis in FIG. 1. With regard to axes for detection of an angular velocity by the head side sensor 71, as illustrated in FIG. 1, a horizontal direction with respect to the head of the user on which the image display unit 20 is mounted is set as the X axis, a front and back direction is set as the Y axis, and a vertical direction is set as the Z axis. More specifically, in a mounted state of the head-mounted type display device 100, the image display unit 20 is located at a horizontal position, which is recognizable by the user, with respect to the right and left eyes.

In addition, the three-axis angular velocity sensor provided to the nine-axis sensor 66 detects rotation around the X axis, the Y axis, and the Z axis. The X axis at which the nine-axis sensor 66 detects the angular velocity corresponds to a horizontal direction of a front section, which includes the right optical image display unit 26 and the left optical image display unit 28, in the frame 2 of the head-mounted type display device 100. In addition, the Y axis corresponds to a back and forth direction of the frame 2, and the Z axis corresponds to a height direction of the frame 2. In a case where the frame 2 is mounted on the head of the user in a typical state, an axis at which the nine-axis sensor 66 detects the angular velocity is substantially equal to an axis at which the head side sensor 71 detects the angular velocity, but may not be equal to each other.

FIG. 3 is a functional block diagram of respective units which constitutes the head-mounted type display device 100.

The head-mounted type display device 100 includes an interface 125 that connects various outer apparatuses OA which are content supply sources. As the interface 125, for example, an interface corresponding to wire connection such as a USB interface, a micro USB interface, and an interface for a memory card can be used, and the interface 125 may be configured as a wireless communication interface. Each of the outer apparatuses OA is an image supply apparatus that supplies an image to the head-mounted type display device 100, and a personal computer (PC), a portable telephone terminal, a portable gaming machine, and the like are used as the outer apparatus OA.

The control device 10 includes the control unit 140, an input information acquisition unit 110, a storage unit 120, a transmission unit (Tx) 51, and a transmission unit (Tx) 52.

The input information acquisition unit 110 is connected to an operation unit 111. The operation unit 111 includes the track pad 14, the direction key 16, the power switch 18, and the like, and the input information acquisition unit 110 acquires input contents on the basis of a signal that is input from the operation unit 111. In addition, the control device 10 includes a power supply unit (not illustrated), and supplies power to the respective units of the control device 10 and the image display unit 20.

The storage unit 120 is a non-volatile storage device, and stores various computer programs, and data relating to the programs. In addition, the storage unit 120 may store data of still image or a moving picture that is displayed on the image display unit 20.

The storage unit 120 stores setting data. The setting data includes a setting value that is set in advance with respect to various kinds of processing executed by the control unit 140. For example, the setting data includes a setting value such as a resolution in a case where an image processing unit 160 and a display control unit 170 process an image signal. The value included in the setting data may be a value that is input in advance through operation by the operation unit 111, or the setting value may be stored after being received from the outer apparatus OA or other apparatuses (not illustrated) through a communication unit 117 or the interface 125.

In addition, the storage unit 120 stores content data. The content data includes image (still image or moving picture) data of contents which are AR displayed by an AR display control unit 185 (position adjustment unit), and/or voice data.

A three-axis sensor 113, a GPS 115, the communication unit 117, and a voice recognition unit 114 are connected to the control unit 140. The three-axis sensor 113 is a three-axis acceleration sensor, and the control unit 140 acquires a detection value of the three-axis sensor 113. The GPS 115 includes an antenna (not illustrated) to receive a global positioning system (GPS) signal, and calculates a current position of the control device 10. The GPS 115 outputs current time or the current position that is obtained on the basis of the GPS signal to the control unit 140. In addition, the GPS 115 may have a function of acquiring current time on the basis of information included in the GPS signal, and correcting time which the control unit 140 clocks.

The communication unit 117 performs wireless data communication in accordance with standards such as wireless LAN (WiFi (registered trademark)), Miracast (registered trademark), and Bluetooth (registered trademark).

In a case where the outer apparatus OA is connected to the communication unit 117 in a wireless manner, the control unit 140 acquires content data from the communication unit 117, and displays an image on the image display unit 20. On the other hand, the outer apparatus OA is connected to the interface 125 in a wire manner, the control unit 140 acquires content data from the interface 125, and displays an image on the image display unit 20. The communication unit 117 and the interface 125 function as a data acquisition unit DA that acquires content data from the outer apparatus OA.

The control unit 140 includes a CPU (not illustrated) that executes a program, a RAM (not illustrated) that temporarily stores a program or data that is executed by the CPU, and a ROM (not illustrated) that stores a basis control program or data which is executed by the CPU in a non-volatile manner. The control unit 140 executes the control program by the CPU to control respective units of the head-mounted type display device 100. In addition, the control unit 140 reads out and executes a computer program that is stored in the storage unit 120 to implement various functions of the control unit 140. That is, the control unit 140 functions as an operating system (OS) 150, the image processing unit 160, the display control unit 170, an imaging processing unit 181, a mounting position detection unit 183, the AR display control unit 185, and the voice processing unit 187.

The image processing unit 160 acquires an image signal that is included in contents. The image processing unit 160 separates a synchronization signal such as a vertical synchronization signal VSync or a horizontal synchronization signal HSync from an image signal that is acquired. In addition, the image processing unit 160 generates a clock signal PCLK by using a phase locked loop (PLL) circuit and the like (not illustrated) in accordance with a cycle of the vertical synchronization signal VSync or the horizontal synchronization signal HSync which is separated. The image processing unit 160 converts an analog image signal, from which the synchronization signal is separated, into a digital image signal by using an A/D conversion circuit and the like (not illustrated). The image processing unit 160 stores the digital image signal after conversion in the RAM of the control unit 140 for each one frame as image data (Data in the drawing) of an object image. Examples of the image data include RGB data.

In addition, the image processing unit 160 may perform a resolution conversion process of converting a resolution of image data to a resolution suitable for the right display drive unit 22 and the left display drive unit 24 as necessary. In addition, the image processing unit 160 may perform an image adjustment process of adjusting luminance or chroma of the image data, a 2D/3D conversion process of creating 2D image data from 3D image data or generating 3D image data from the 2D image data, and the like.

The image processing unit 160 transmits the clock signal PCLK, the vertical synchronization signal VSync, the horizontal synchronization signal HSync, image data Data that is stored in the RAM via the transmission units 51 and 52. The transmission units 51 and 52 function as a transceiver and perform serial transmission between the control device 10 and the image display unit 20. In addition, image data Data, which is transmitted through the transmission unit 51, is referred to as "image data for the right eye", and image data Data, which is transmitted through the transmission unit 52, is referred to as "image data for the left eye".

The display control unit 170 generates a control signal that controls the right display drive unit 22 and the left display drive unit 24, and controls generation and emission of image light by each of the right display drive unit 22 and the left display drive unit 24 by using the control signal. Specifically, the display control unit 170 controls drive ON/OFF of the right LCD 241 by the right LCD control unit 211, and drive ON/OFF of the right backlight 221 by the right backlight control unit 201. In addition, the display control unit 170 controls drive ON/OFF of the left LCD 242 by the left LCD control unit 212, and drive ON/OFF of the left backlight 222 by the left backlight control unit 202.

The image processing unit 160 and the display control unit 170 have a function of changing an image display position on the right LCD 241 and the left LCD 242 in accordance with control of the AR display control unit 185 to be described later. Specifically, in a case where the AR display control unit 185 generates control data representing a shift amount and a shift direction for shifting a display position, the image processing unit 160 shifts the image data in accordance with the control data. In addition, the display control unit 170 controls the right LCD control unit 211 and the left LCD control unit 212 in accordance with the control data that is generated by the AR display control unit 185 to shift an image display position on the right LCD 241 and the left LCD 242.

In addition, the image processing unit 160 and the display control unit 170 have a function of changing an image display size on the right LCD 241 and the left LCD 242 in accordance with control of the AR display control unit 185 to be described later. Specifically, in a case where the AR display control unit 185 generates control data that designates the display size, the image processing unit 160 expands or reduces image data in accordance with the control data. In addition, the display control unit 170 controls the right LCD control unit 211 and the left LCD control unit 212 in accordance with the control data that is generated by the AR display control unit 185 to expand or reduce an image display size on the right LCD 241 and the left LCD 242.

Any one of the image processing unit 160 or the display control unit 170 may perform the above-described process to change the display position. In addition, both the image processing unit 160 and the display control unit 170 may perform the process, and in this case, the AR display control unit 185 may generate control data that corresponds to each of the image processing unit 160 and the display control unit 170.

The imaging processing unit 181 controls the camera 61 to allow the camera 61 to captures an image, and acquires captured image data.

The mounting position detection unit 183 is connected to the nine-axis sensor 66 and the head side sensor 71 to acquire a detection value of movement of the frame 2, and a detection value of an angular velocity relating to movement of the head side sensor 71. The mounting position detection unit 183 functions as a detection unit according to the invention in combination with the nine-axis sensor 66, and the detection unit cooperates with the head side sensor 71. The detection units are provided at a position out of a range that is visually recognized by the user through the image display unit 20.

The mounting position detection unit 183 retains detection values of the nine-axis sensor 66 and the head side sensor 71 at a point of time (reference time) that is designated in a state in which the image display unit 20 is mounted on the user, or a difference between the detection value of the nine-axis sensor 66 and the detection value of the head side sensor 71. The values, which are retained, are set as a reference value. The reference value may be stored in a memory (not illustrated) provided to the control unit 140, or may be stored in the storage unit 120.

The mounting position detection unit 183 acquires the detection values of the nine-axis sensor 66 and the head side sensor 71, and compares the detection values, which are acquired, or a difference between the detection values with a reference value so as to detect a variation in the relative position of the frame 2 to the head of the user, thereby calculating the amount of variation.

The AR display control unit 185 reads out content data that is stored in the storage unit 120 to control the image processing unit 160 and the display control unit 170, and allows the image display unit 20 to display an image for AR display. In addition, in a case where a content data 123 includes a voice data, the AR display control unit 185 controls the voice processing unit 187 to output voice of the content from the right earphone 32 and the left earphone 34.

The AR display control unit 185 displays AR contents in a state in which the user views an object over the image display unit 20. The AR display control unit 185 performs AR display in which an image, a character, and the like are displayed at a position corresponding to the object to provide information relating to the object or to change visibility of a figure of the object over the image display unit 20. The AR contents include data of an image or a character that is displayed at a position corresponding to the object. In addition, the AR contents may include data that specifies the object, data relating to a display position of an image or a character, and the like. The display position of the AR contents may be a position overlapping the object, or the periphery of the object. The object may a material body, and examples thereof include real estate such as building, a moving body such as a vehicle and an electric train, and a living thing such as a human being and an animal. The AR display control unit 185 detects an object that is located in a visual field of the user from captured image data that is acquired by the imaging processing unit 181. In addition, the AR display control unit 185 determines a display position of the AR contents corresponding to the detected object to display the AR contents.

It is preferable to display the AR contents in a state of overlapping a position at which the user views the object, or in conformity to the position at which the user views the object. According to this, the AR display control unit 185 detects an image of the object from the captured image data acquired by the imaging processing unit 181, and specifies a position of the object in an imaging range of the camera 61 on the basis of a positional relationship between the detected image of the object, and the entirety of a captured image.

For example, when initiating the AR display, the AR display control unit 185 performs calibration for specifying a positional relationship between the imaging range of the camera 61 and the display region of the image display unit 20. After performing the calibration, the imaging range of the camera 61 and the display region of the image display unit 20 can be associated with each other. Accordingly, after detecting an object of the AR display from the captured image of the camera 61, it is possible to display contents at a position corresponding to the object.

For example, in the calibration, a captured image of the camera 61, which images an actual object, is displayed in the display region of the image display unit 20. In addition, the object that is visually recognized through the display region of the image display unit 20, and the object that is displayed as an image in the display region of the image display unit 20 are made to overlap each other in the eyes of the user on which the head-mounted type display device 100 is mounted. More specifically, the display position or the display size of the image display unit 20 are adjusted so that an image of the object that is visually recognized through the display region of the image display unit 20, and an image of the object that is displayed in the display region of the image display unit 20 are visually recognized in a state in which their positions, sizes, and directions substantially coincide with each other. As described later, the adjustment is performed by the AR display control unit 185 of the control unit 140 in accordance with an operation of the user.

In addition, in a case where the relative position between the imaging range of the camera 61 and the display region of the image display unit 20, which are associated in the calibration, varies due to a deviation in a position of the frame 2, and the like, the AR display control unit 185 can correct the display position of the contents in conformity to the variation.

In this case, the AR display control unit 185 calculates a direction in which the display position is moved, and the amount of movement on the basis of the amount of variation which is calculated by the mounting position detection unit 183. The AR display control unit 185 generates control data relating to the movement (shift) of the display position, and output the control data to the image processing unit 160 and the display control unit 170 so as to move the display position. Here, the AR display control unit 185 may generate and output control data for changing a content display size.

The voice processing unit 187 acquires a voice signal that is included in the contents, amplifies the voice signal that is acquired, and output the voice signal to the right earphone 32 and the left earphone 34. In addition, the voice processing unit 187 acquires voice that is collected with the microphone 63, and converts the voice into digital voice data. The voice processing unit 187 may perform processing that is set in advance with respect to the digital voice data.

The image display unit 20 includes an interface 25, the right display drive unit 22, the left display drive unit 24, the right light guiding plate 261 as the right optical image display unit 26, the left light guiding plate 262 as the left optical image display unit 28, the camera 61, a vibration sensor 65, and the nine-axis sensor 66.

The vibration sensor 65 is constituted by using an acceleration sensor. For example, as illustrated in FIG. 1, the vibration sensor 65 is embedded in the right holding unit 21 at a position in the vicinity of the end ER of the right optical image display unit 26. In a case where the user performs an operation of beating (knocking operation) the end ER, the vibration sensor 65 detects vibration due to the operation, and outputs a detection result to the control unit 140. The control unit 140 detects the knocking operation performed by the user in accordance with the detection result of the vibration sensor 65.

The nine-axis sensor 66 is a motion sensor that detects acceleration (three axes), angular velocity (three axes), and terrestrial magnetism (three axes). When the image display unit 20 is mounted on the head of the user, the control unit 140 can detect movement of the head of the user on the basis of a detection value of the nine-axis sensor 66. For example, the control unit 140 can estimate the magnitude of inclination and the direction of inclination of the image display unit 20 on the basis of the detection value of the nine-axis sensor 66.

The interface 25 includes a connector to which the right cord 42 and the left cord 44 are connected. The interface 25 outputs a clock signal PCLK, a vertical synchronization signal VSync, a horizontal synchronization signal HSync, and image data Data, which are transmitted from the transmission unit 51, to a corresponding reception unit (Rx) 53 or 54. In addition, the interface 25 outputs a control signal, which is transmitted from the display control unit 170, to a corresponding unit such as the reception units 53 and 54, the right backlight control unit 201, and the left backlight control unit 202.

In addition, the interface 25 is an interface that connects the camera 61, the vibration sensor 65, and the nine-axis sensor 66. A vibration detection result obtained by the vibration sensor 65, and an acceleration (three axes) detection result, an angular velocity (three axes) detection result, and a terrestrial magnetism (three axes) detection result, which are obtained by the nine-axis sensor 66, are transmitted to the control unit 140 through the interface 25.

The right display drive unit 22 includes the right backlight 221, the right LCD 241, and the right projection optical system 251. In addition, the right display drive unit 22 includes the reception unit 53, the right backlight (BL) control unit 201 that controls the right backlight (BL) 221, and the right LCD control unit 211 that controls the right LCD 241.

The reception unit 53 operates as a receiver corresponding to the transmission unit 51, and performs serial transmission between the control device 10 and the image display unit 20. The right backlight control unit 201 drives the right backlight 221 on the basis of a control signal that is input. The right LCD control unit 211 drives the right LCD 241 on the basis of the clock signal PCLK, the vertical synchronization signal VSync, the horizontal synchronization signal HSync, and the image data Data for the right eye which are input through the reception unit 53.

The left display drive unit 24 has the same configuration as that of the right display drive unit 22. The left display drive unit 24 includes the left backlight 222, the left LCD 242, and the left projection optical system 252. In addition, the left display drive unit 24 includes the reception unit 54, the left backlight control unit 202 that drives the left backlight 222, and the left LCD control unit 212 that drives the left LCD 242.

The reception unit 54 operates as a receiver corresponding to the transmission unit 52, and performs serial transmission between the control device 10 and the image display unit 20. The left backlight control unit 202 drives the left backlight 222 on the basis of a control signal that is input. The left LCD control unit 212 drives the left LCD 242 on the basis of the clock signal PCLK, the vertical synchronization signal VSync, the horizontal synchronization signal HSync, and the image data Data for the right eye which are input through the reception unit 54.

In addition, the right backlight control unit 201, the right LCD control unit 211, the right backlight 221, and the right LCD 241 may be collectively referred to as "image light generation unit" on a right side. Similarly, the left backlight control unit 202, the left LCD control unit 212, the left backlight 222, and the left LCD 242 may be collectively referred to as "image light generation unit" on a left side.

However, in a case where the user views an image in a state in which the head-mounted type display device 100 is mounted on the user, when a relative position between the eyes of the user and the frame 2 varies, this variation has an effect on the visibility of the image on the user side.

Figure 4A:
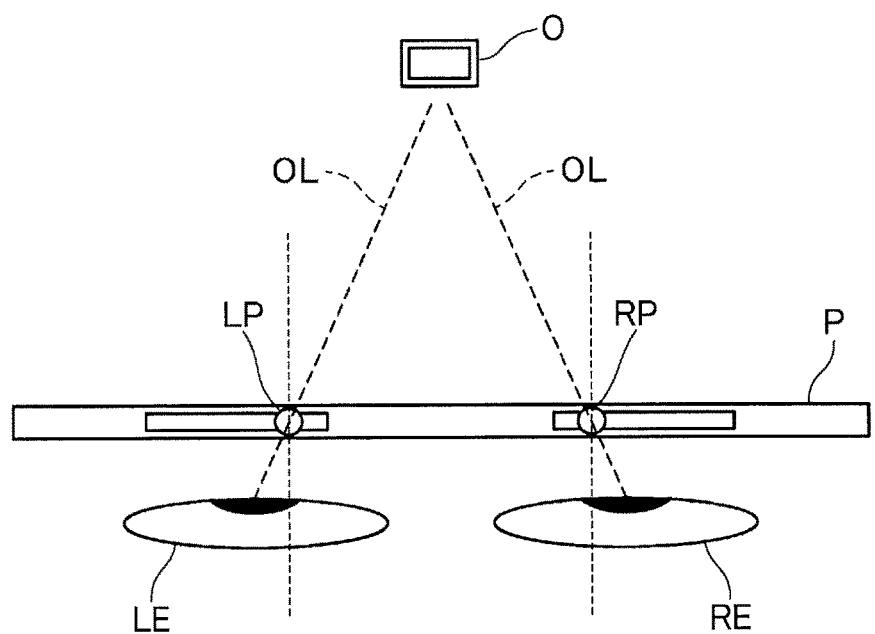
FIGS. 4A and 4B are views illustrating a relative position between an eye of a user and a display image.
Figure 4B:
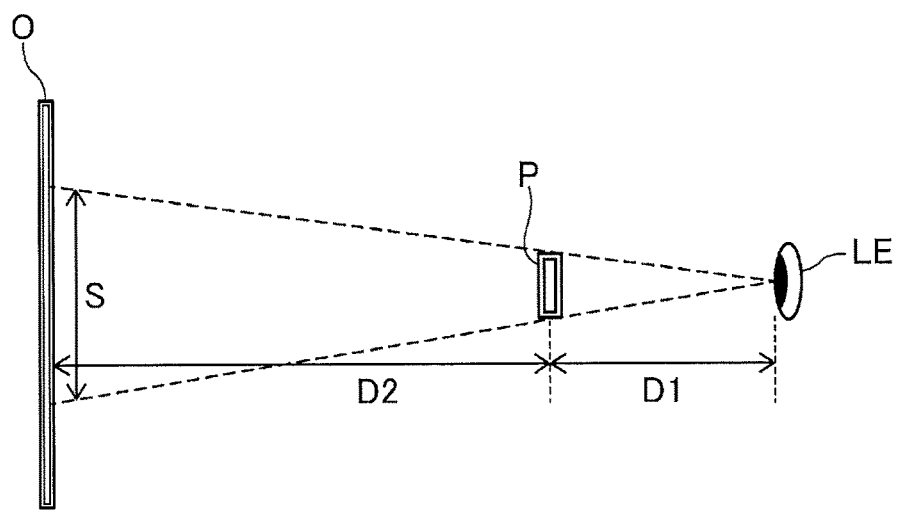

FIGS. 4A and 4B are views illustrating the positional relationship between the eyes of the user and the frame 2. FIG. 4A is a plan view and FIG. 4B is a side view.

FIGS. 4A and 4B illustrates an example in which the image display unit 20 is mounted on the head of the user, and the user visually recognizes an object O that is located in front of the user. The image display unit 20 allows the user to visually recognize contents (hereinafter, referred to as AR contents) of an image exhibiting an augmented reality (AR) effect, and the like. Actually, the user visually recognizes the object O in front of the user over the right light guiding plate 261, the left light guiding plate 262, and the dimming plate 20A, and thus the user visually recognizes the AR contents. In addition, when the AR contents are seen in a state of overlapping the object O, an AR effect is obtained.

The image display unit 20 allows the image light L to be incident to the eyes of the user by using the right light guiding plate 261 and the left light guiding plate 262 so as to allow the user visually recognize the AR contents. At this time, the AR contents which are visually recognized by the user is a virtual image formed in the eyes by the image light L not a real image formed on the right light guiding plate 261. In FIGS. 4A and 4B, in a case where the virtual image generated by the image display unit 20 is regarded as the real image, a display position in the depth direction is represented by a symbol P. In other words, when the image (real image) is displayed at the image display position P, this image can be regarded as equivalent to the virtual image that is generated by the image display unit 20.

The image display position P is a position on a virtual axial line that connects the both eyes of the user and the object O, and is determined by the position of the half mirrors 261A and 262A.

As illustrated in FIG. 4A, in a case where the user visually recognizes the object O, outside light OL is incident to the right eye RE and the left eye LE from the object O. At this time, AR contents, which are located at a position RP of an image that is displayed at the image display position P, are visually recognized to the right eye RE in a state of overlapping the object O. In addition, AR contents, which are located at a position LP of the image that is displayed at the image display position P, are visually recognized to the left eye LE in a state of overlapping the object O.

Accordingly, when the head-mounted type display device 100 displays the AR contents at the display position P in such a manner that the AR contents are visually recognized at positions indicated by the symbols RP and LP, the AR contents and the object O overlap each other, and thus it is possible to sufficiently obtain the AR effect.

In addition, FIG. 4B illustrates an effect of a distance between the object O and the right eye RE and the left eye LE. In addition, FIG. 4B is a side view, and thus the left eye LE of the user is illustrated, but visibility on the right eye RE of the user can be regarded as the same as in the left eye LE.

When being viewed in a state of overlapping the object O, the AR contents has an effect of providing information, which does not exist in a real landscape, to the user, or allowing the object O to be visually recognized with visibility different from that of the real landscape. According to this, it is preferable that a visual recognition size of the AR contents and the real size of the object O correspond to each other.

As illustrated in FIG. 4B, the visual recognition size of the AR contents on a user side is determined by a display size at the position P, a distance D1 between the left eye LE and the position P, and a distance D2 between the position P and the object O. Here, the distance D1 between image display position P and the left eye LE is approximately constant in accordance with the shape and specification of the image display unit 20. However, in a case where the position of the frame 2 deviates, the distance D1 varies. According to this, the size of the AR contents which are visually recognized by the user is changed.

In addition, in a case where the position of the frame 2 deviates, a relative positional relationship between the object O, the eye RE or LE of the user, and the position RP or LP, which are illustrated in FIG. 4A, varies. That is, a relative position of the position RP varies from a straight line that connects the object O and the right eye RE. This is also true of the left eye LE and the position LP. This variation causes a variation in a display position of the AR contents which are displayed on the image display unit 20, and this variation is visually recognized by the user in such a manner that the display position of the AR contents deviates.

Therefore, in a case where the head-mounted type display device 100 is mounted on the user and the AR contents are displayed, when the position of the frame 2 to the head of the user varies, the head-mounted type display device 100 adjusts the display position and/or the display size of the AR contents in correspondence with the variation. For example, the display position of the AR contents is adjusted in correspondence with a variation in the relative positional relationship between the object O, the eye RE or LE of the user, and the position RP or LP which are illustrated in FIG. 4A. In addition, for example, the display size of the AR contents is adjusted in correspondence with a variation in values of the distance D1 between the left eye LE and the position P, and the distance D2 between the position P and the object O which are illustrated in FIG. 4B, or a ratio between the distances.

A variation in a relative position between the eyes of the user and the half mirrors 261A and 262A which are the display regions of the image display unit 20 can be detected as a variation in the relative position between the head of the user and the frame 2. This configuration has advantages in that it is not necessary to directly observe the eyes of the user, and the configuration becomes simple. For example, in the configuration described in International Publication No. 2012/172719, it is necessary to provide a camera that images the inner corner or the outer corner of an eye of the user, a light source, and an interconnection for connection in a limited space that faces a user side in the HMD. In contrast, the configuration of this embodiment can be implemented by detecting a variation in the relative position between the head of the user and the frame 2. Accordingly, a complicated structure for provision of a functional unit configured to observe the eyes of the user in the frame 2, and the like, or structural restrictions are less likely to occur. Accordingly, a device configuration of the head-mounted type display device 100 is simple, and it is less likely to receive structural restrictions. As a result, for example, in a case where the frame 2 is miniaturized, or is configured as a thin frame, the head-mounted type display device 100 is excellent when considering easiness of implementation. In addition, since the relative position of the frame 2 to the head of the user or a variation in the relative position is detected by using a configuration such as the nine-axis sensor 66 and the head side sensor 71 which are capable of realizing a detection rate higher than a detection rate (frame rate) of a camera, or a configuration capable of realizing a resolution (detection accuracy) higher than a resolution of the camera, in comparison to a configuration in which image data such as a captured image acquired by a camera is processed, there is an advantage in that detection delay of the relative position is less likely to occur, and an HMD with higher detection accuracy with respect to the relative value is obtained. In addition, in this embodiment, differently from the case of using the camera, it is not necessary to perform image processing in which feature points are extracted from each frame of the captured image during detection of the relative position. Accordingly, it is possible to more rapidly detect the relative position.

Figure 5:
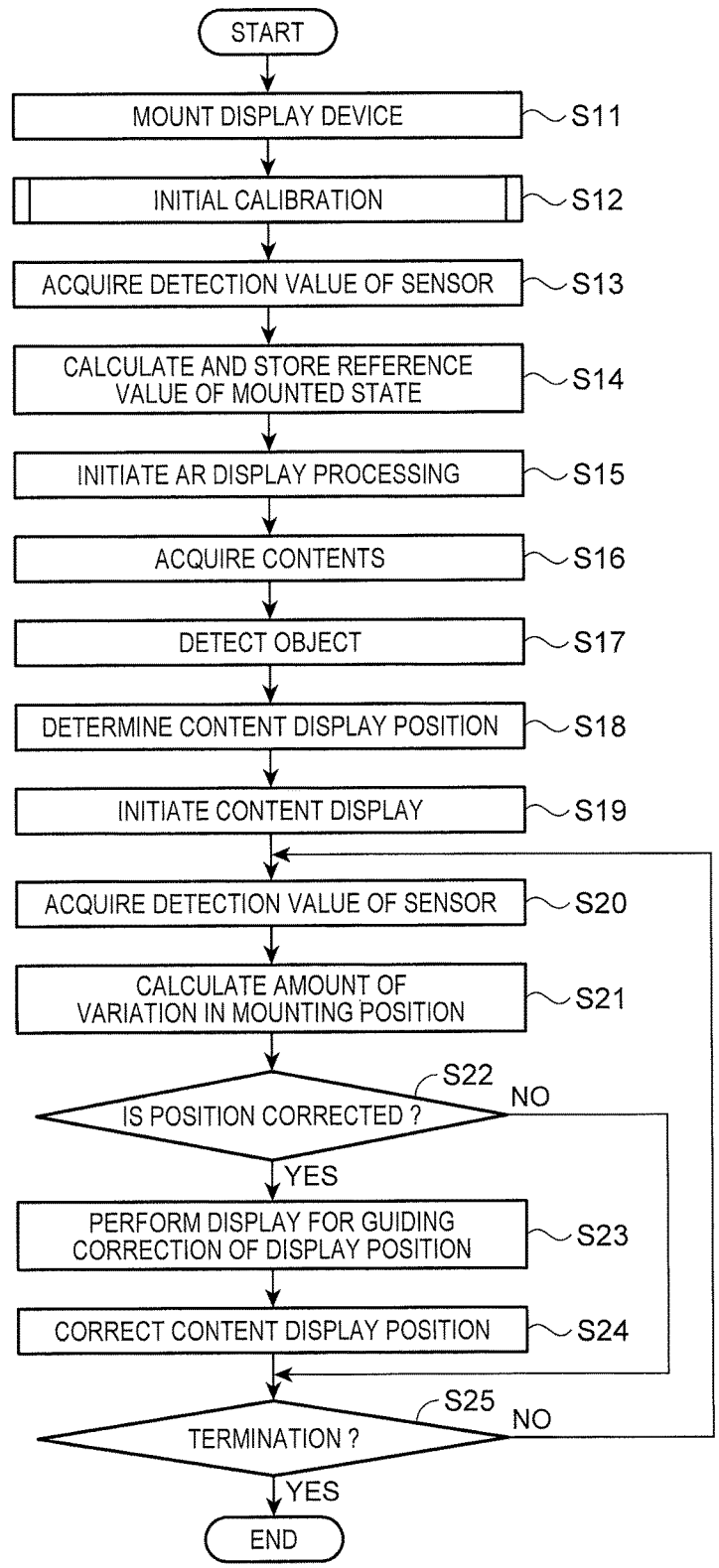
FIG. 5 is a flowchart illustrating an operation of the head-mounted type display device.
Figure 6:
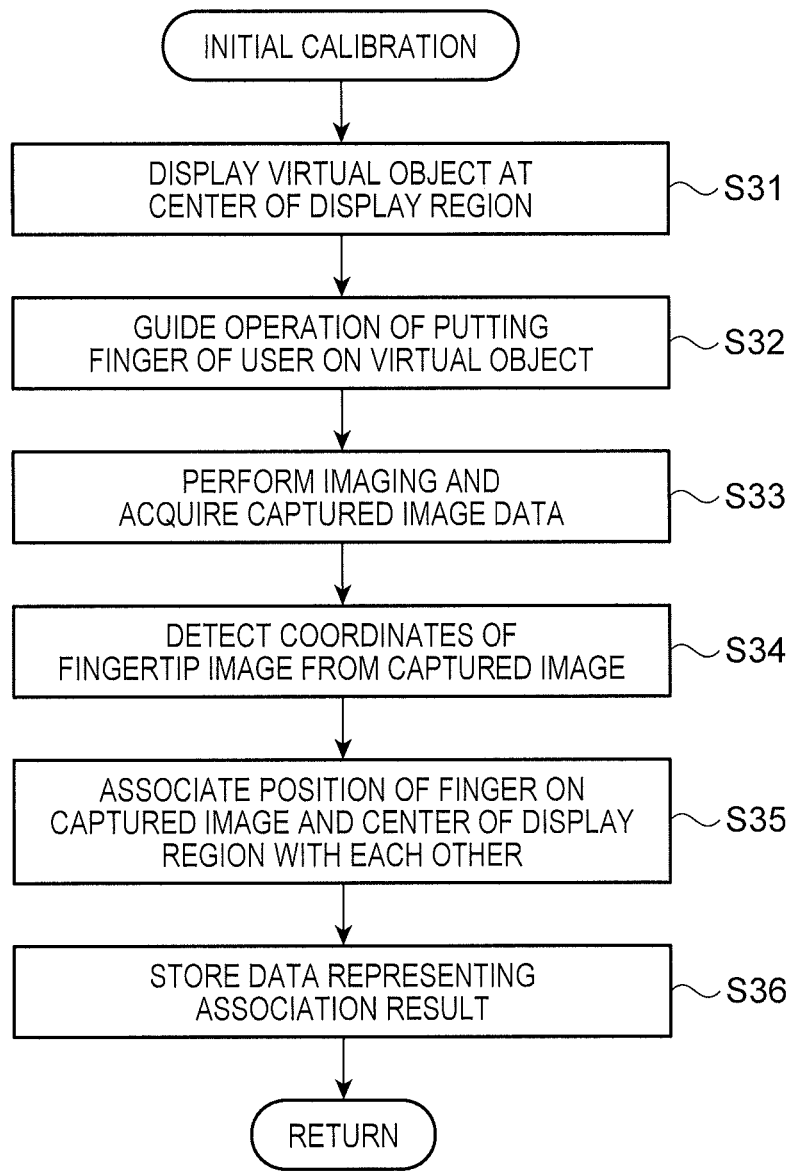
FIG. 6 is a flowchart illustrating an operation of the head-mounted type display device.

FIGS. 5 and 6 are flowcharts illustrating an operation of the head-mounted type display device 100. Particularly, FIG. 5 illustrates calibration that is performed through control of the control unit 140.

When the head-mounted type display device 100 is mounted on the user (step S11), and the user performs an operation for initiation, the AR display control unit 185 of the control unit 140 performs initial calibration (step S12).

FIG. 6 illustrates the initial calibration operation in detail.

The AR display control unit 185 control the image processing unit 160 and the display control unit 170 to allow the image display unit 20 to display an image for calibration (step S31). The image for calibration is an image, a character, or a symbol that is used by the user as a reference. Here, the image for calibration is set as a virtual object. The AR display control unit 185 displays the virtual object on the center of the display region of the image display unit 20. In addition, the center of the display region of the image display unit 20 represents the center of the half mirrors 261A and 262A. In this embodiment, the center of the right LCD 241 and the left LCD 242 corresponds to the center of the half mirrors 261A and 262A. In addition, the virtual object may be displayed on any of the half mirrors 261A and 262A.

Then, the AR display control unit 185 guides the user to put a finger on the virtual object (step S32). For example, this guide operation is performed by a method of displaying an image or a character on the right LCD 241 and/or the left LCD 242, and a method in which the voice processing unit 187 outputs voice from the right earphone 32 and/or the left earphone 34. The user puts a finger at a position that overlaps the object in accordance with the guiding.

Here, the imaging processing unit 181 controls the camera 61 to perform imaging, and the AR display control unit 185 acquires captured image data (step S33). The AR display control unit 185 performs image processing with respect to the captured image data to detect a finger image from the captured image, and calculates coordinates of a fingertip in the captured image (step S34). In the process of detecting the finger image from the captured image by the AR display control unit 185, for example, a feature amount of an image, which is stored in the storage unit 120 in advance, and the like may be used. In addition, in the initial calibration, a pen-shaped or a rod-shaped support body, and the like can be used instead of a finger. In this case, necessary data such as the feature amount for detection of an image of the support body may be stored in the storage unit 120 in advance.

The AR display control unit 185 performs a process of associating the position at which the finger image is detected on the captured image, and the center of the display region on the basis of the coordinates of the finger-tip in the captured image (step S35), and stores data indicating a result of the process in the storage unit 120 (step S36).

When using the data stored in step S36, in a case where an object image is detected from an image captured by the camera 61, the control unit 140 can specify a position on the display region which is visually recognized by the user in a state of overlapping the position of the object.

Returning to FIG. 5, after performing the initial calibration, the mounting position detection unit 183 acquires detection values of the nine-axis sensor 66 and the head side sensor 71 (step S13), calculates a reference value(s) based on the detection values which are acquired, and stores the reference values in the storage unit 120 (step S14). The reference values, which are stored in step S14, may be the detection values themselves which are acquired in step S13. The reference value(s), which is stored in step S14, is a value(s) representing a relative position between the frame 2 and the head of the user in a state in which the calibration is performed. In addition, timing at which the detection values are acquired in step S13 corresponds to a reference time according to the invention.

Then, the AR display control unit 185 initiates a process of displaying the AR contents (step S15). The AR display control unit 185 acquires content data from the storage unit 120 (step S16), the imaging processing unit 181 allows the camera 61 to perform imaging, and the AR display control unit 185 detects an object from the captured image data (step S17). Then, the AR display control unit 185 determines the display position of the AR contents on the basis of a position of the object (step S18), and initiates display of the AR contents (step S19).

After initiation of the display of the AR contents, the mounting position detection unit 183 acquires detection values of the nine-axis sensor 66 and the head side sensor 71 (step S20), and calculates the amount of variation in the relative position of the frame 2 to the head on the basis of the detection values which are acquired (step S21).

The AR display control unit 185 determines whether or not correction of the display position of the AR contents is necessary on the basis of the amount of variation that is calculated by the mounting position detection unit 183 (step S22). For example, in a case where the amount of variation, which is calculated by the mounting position detection unit 183, is greater than a threshold value that is stored in the storage unit 120, the correction of the display position is determined as necessary.

In a case where the correction of the display position is determined as necessary (YES in step S22), the AR display control unit 185 makes a notification for correction of the display position (step S23). For example, in step S23, a message or an image for notification is displayed on the image display unit 20. As is the case with the AR contents, this message or image may be displayed in conformity to a position of an object, or the message or the image for notification may be displayed at a display position of the AR contents after correction.

Here, the AR display control unit 185 may transition to step S24 without making the notification in step S23, and may automatically transition to step S24 after predetermined time has elapsed from the notification is made in step S23.

In addition, the AR display control unit 185 may wait an operation of a user after the notification is made in step S23, and in a case where the user performs an operation of instructing execution, the AR display control unit 185 may transition to step S24.

The AR display control unit 185 corrects the display position of the AR contents in accordance with the amount of variation that is calculated by the mounting position detection unit 183, or the amount of correction that is calculated from the amount of variation (step S24), and determines whether or not termination conditions are satisfied (step S25). In addition, in a case where it is determined that the display position is not corrected (NO in step S22), the control unit 140 transitions to step S25, and determines whether or not termination conditions are satisfied.

In a case where the termination conditions are satisfied (YES in step S25), the control unit 140 terminates the process. In addition, in a case where the termination conditions are not satisfied (NO in step S25), the process returns to step S20. Examples of the termination conditions include a situation in which the AR contents are displayed to the end and display is completed, a situation in which termination of the display of the AR contents is instructed by the operation of the operation unit 135, a situation in which termination of the operation is instructed by an outside apparatus through the interface 125, and the like.

As described above, the head-mounted type display device 100 of this embodiment, to which the invention is applied, includes the image display unit 20 that is mounted on the head of the user to display an image, and is capable of transmitting light from an external landscape or scene. The head-mounted type display device 100 includes the nine-axis sensor 66, the head side sensor 71, and the mounting position detection unit 183 as a detection unit that detects a relative position of the image display unit 20 to the head of the user. The AR display control unit 185 adjusts a display position of an object such as AR contents which are displayed on the image display unit 20 on the basis of detection results of the nine-axis sensor 66 and the head side sensor 71.

According to the configuration of the head-mounted type display device 100 and the method of controlling the head-mounted type display device 100, the head-mounted type display device 100 having a simple device configuration can adjust display in correspondence with a variation in the relative position of the image display unit 20 to the head of the user. According to this, the user can view an image in a preferable state.

In addition, the control unit 140 obtains the amount of variation of the relative position of the image display unit 20 to the head of the user from the reference time on the basis of the detection results of the nine-axis sensor 66 and the head side sensor 71. According to this, it is possible to obtain the variation in the relative position of the image display unit 20 to the head of the user as the amount of variation from the reference time, and thus it is possible to easily perform display adjustment in correspondence with the variation in the relative position, and the like.

In addition, the control unit 140 sets the reference time in a state in which the display position of the AR contents displayed on the image display unit 20 is adjusted, for example, after performing the initial calibration. According to this, it is possible to easily adjust the display position of the AR contents in correspondence with the variation in the relative position of the image display unit 20 to the head of the user.

In addition, the head-mounted type display device 100 includes the nine-axis sensor 66 that detects the movement or pose of the image display unit 20. The mounting position detection unit 183 detects the relative position of the image display unit 20 to the head of the user on the basis of an output of the nine-axis sensor 66, and an output of the head side sensor 71 that is provided to the head of the user to detect the movement or pose of the head of the user. According to this, it is possible to easily detect a variation in the relative position of the image display unit 20 to the head of the user.

In addition, it is not necessary for the head-mounted type display device 100 to include, for example, a configuration of directly observing the eyes of the user as described in International Publication No. 2012/172719. According to this, in comparison to a case where a camera and the like, which have restrictions on an installation position, are provided in a limited area of the frame 2, it is not necessary to have a complicated structure, and thus it is less likely to receive structural restrictions. According to this, it is possible to implement the device configuration of the head-mounted type display device 100 as a simple configuration. In addition, for example, in a case where the frame 2 is miniaturized, or is configured as a thin frame, the head-mounted type display device 100 is excellent when considering easiness of implementation. In addition, in the head-mounted type display device 100 of this embodiment, the display position of an object such as the AR contents which are displayed on the image display unit 20 is adjusted in correspondence with the variation in the relative position of the image display unit 20 to the head of the user. According to this, in comparison to a case of mechanically correcting a positional deviation of the display device, it is still less likely to receive structural restrictions, and the adjustment can be realized by a simple device configuration. As a result, miniaturization is also easy.

In the first embodiment, as an example, description has been given of a configuration in which the mounting position detection unit 183 and the nine-axis sensor 66 as a detection unit in the head-mounted type display device 100 cooperate with the head side sensor 71. The invention is not limited to this configuration, and the sensor that is provided to the detection unit can employ the other configurations. A specific example of the configuration will be described in a second embodiment and a third embodiment.

Second Embodiment

Figure 7:
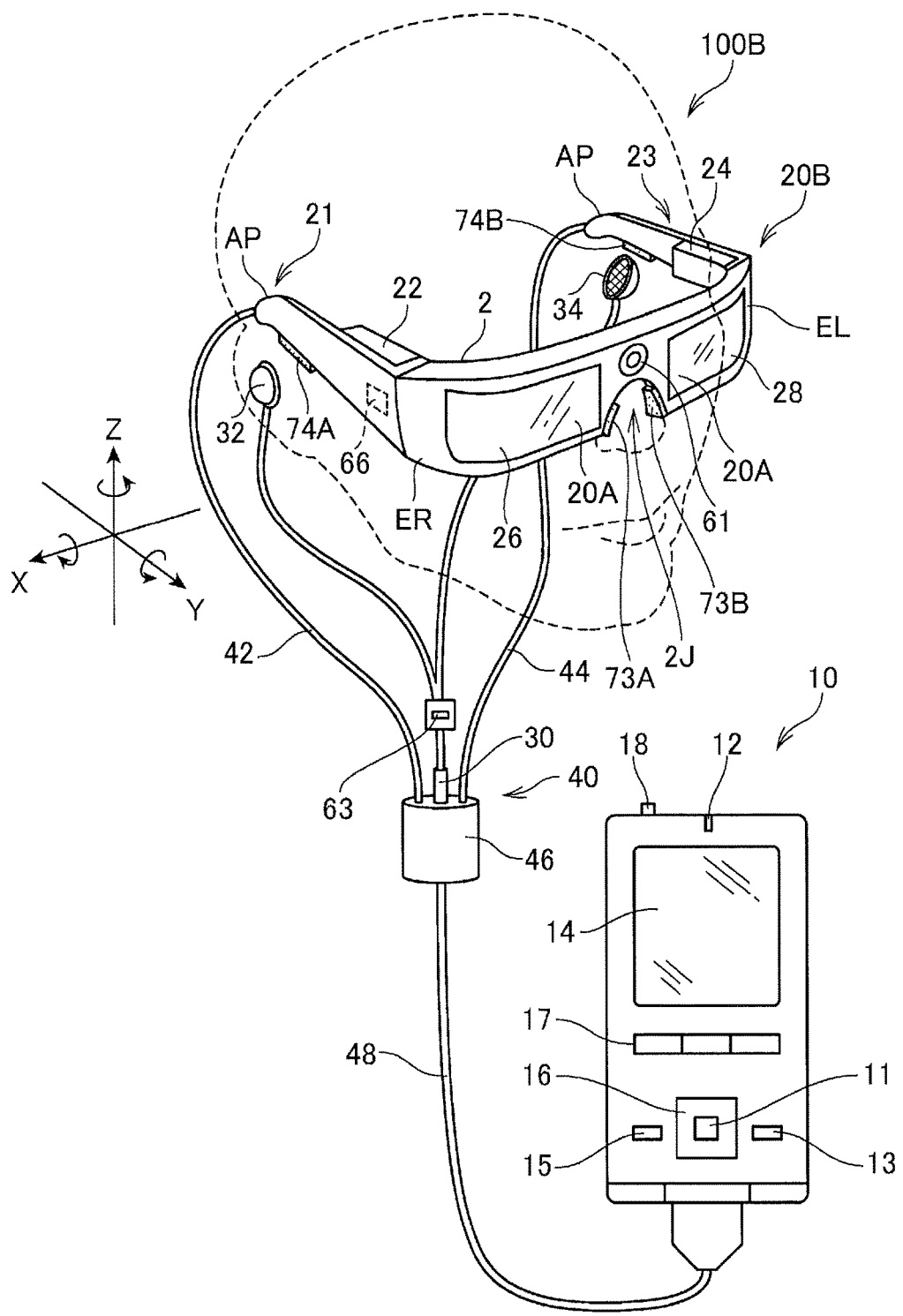
FIG. 7 is a view illustrating an external appearance configuration of a head-mounted type display device according to a second embodiment.
Figure 8:
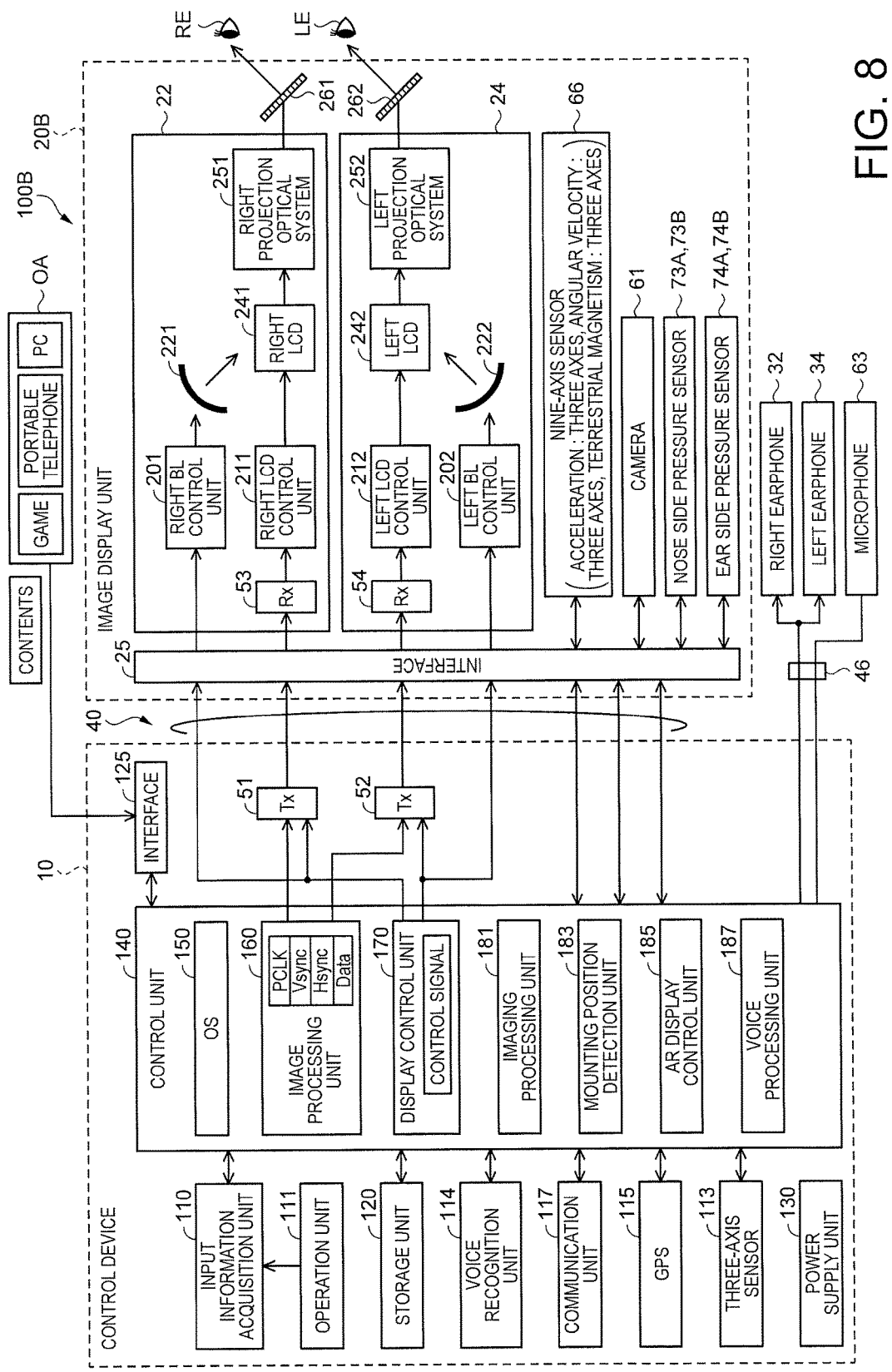
FIG. 8 is a functional block diagram of respective units which constitute the head-mounted type display device of the second embodiment.

FIG. 7 is a view illustrating an external appearance configuration of a head-mounted type display device 100B (display device) according to a second embodiment. In addition, FIG. 8 is a functional block diagram of respective units which constitute the head-mounted type display device 100B.

The head-mounted type display device 100B of the second embodiment includes an image display unit 20B instead of the image display unit 20. The image display unit 20B has a configuration in which a nose side pressure sensor 73 and an ear side pressure sensor 74 are provided instead of the nine-axis sensor 66 of the image display unit 20. In addition, in the head-mounted type display device 100B, the head side sensor 71 illustrated in FIG. 1 is not used. With regard to respective units, the head-mounted type display device 100B has the configuration common to the head-mounted type display device 100 of the first embodiment except for the above-described difference. In the head-mounted type display device 100B, the same reference numerals will be given to the same constituent units which are common to those in the head-mounted type display device 100, and illustration and description thereof will not be repeated.

As illustrated in FIG. 7, the frame 2 includes two nose side pressure sensors 73A and 73B, and two ear side pressure sensors 74A and 74B. The nose side pressure sensors 73A and 73B are disposed to be horizontally symmetrical at the center between the right optical image display unit 26 and the left optical image display unit 28. In a state in which the frame 2 is mounted on the head of the user, the nose side pressure sensors 73A and 73B are fixed to a concave portion 2J of the frame 2, which is formed to come into contact with the nose, at a position that comes into contact with the nose of the user. In a state in which the frame 2 is mounted on the head of the user, the nose side pressure sensor 73A comes into contact with a face of the nose on a right eye side, and the nose side pressure sensor 73B comes into contact with a face of the nose on a left eye side.

In addition, the ear side pressure sensors 74A and 74B are fixed lower surfaces of the right holding unit 21 and the left holding unit 23 which constitute the temple of the eyeglass-shaped frame 2. That is, in a state in which the frame 2 is mounted on the head of the user, the ear side pressure sensors 74A and 74B are respectively located at positions which come into contact with the ears of the user. In a state in which the frame 2 is mounted on the head of the user, the ear side pressure sensor 74A comes into contact with an upper portion of the right ear, and the ear side pressure sensor 74B comes into contact with an upper portion of the left ear.

The nose side pressure sensors 73A and 73B, and the ear side pressure sensors 74A and 74B are pressure sensors which output a detection value in accordance with a pressure that is applied in a case where the pressure is applied. When the frame 2 is mounted on the user, the nose side pressure sensors 73A and 73B detect a load of the frame 2 which is applied to the nose of the user, and the ear side pressure sensors 74A and 74B detect a load that is applied to the ears of the user.

As illustrated in FIG. 8 the nose side pressure sensors 73A and 73B, and the ear side pressure sensors 74A and 74B are connected to the control unit 140, respectively. The mounting position detection unit 183 can acquire a detection value of each of the nose side pressure sensors 73A and 73B. In addition, the mounting position detection unit 183 can acquire a detection value of each of the ear side pressure sensors 74A and 74B. In this configuration, the mounting position detection unit 183 constitute a detection unit in combination with the nose side pressure sensors 73A and 73B, and the ear side pressure sensors 74A and 74B, and functions as a pressure sensor that detects a pressure between the frame 2 as a display unit main body that supports the image display unit 20B, and the head of the user. In addition, the above-described detection units are provided at a position out of a range that is visually recognized by the user through the image display unit 20B.

In a state in which the frame 2 is mounted on the head of the user, a detection value of the nose side pressure sensors 73A and 73B, and a detection value of the ear side pressure sensors 74A and 74B vary in accordance with the relative position between the frame 2 and the head of the user. For example, in a case where the position of the frame 2 varies, a detection value of each of the nose side pressure sensors 73A and 73B, and the ear side pressure sensors 74A and 74B varies. In addition, a crosswise difference between detection values of the nose side pressure sensors 73A and 73B, and a crosswise difference between detection values of the ear side pressure sensors 74A and 74B also vary. Accordingly, the mounting position detection unit 183 can detect a variation in the position of the frame 2 on the basis of the detection values of the nose side pressure sensors 73A and 73B and the ear side pressure sensors 74A and 74B. In addition, it is possible to estimate the magnitude of the variation in the position of the frame 2 by performing arithmetic processing of obtaining the cross-wise difference between the detection values of the nose side pressure sensors 73A and 73B, and the cross-wise difference between the detection values of the ear side pressure sensors 74A and 74B.

In the operation illustrated in FIG. 5 described in the first embodiment, the mounting position detection unit 183 acquires a detection value at the reference time in step S14. In addition, a detection value is acquired in step S20, and the amount of variation in the mounting position of the frame 2 is calculated in step S21 on the basis of the detection value. For example, even in a case where the amount of variation that is calculated in step S21 is the value that is estimated as described, it is possible to accomplish the objective.

The mounting position detection unit 183 acquires a detection value of each of the nose side pressure sensors 73A and 73B and the ear side pressure sensors 74A and 74B in step S13 and step S20 in FIG. 5. In addition, the mounting position detection unit 183 performs comparison between the detection values which are acquired, or arithmetic processing with respect to the detection values which are acquired.

As described above, the head-mounted type display device 100B is configured to include the nose side pressure sensors 73A and 73B and the ear side pressure sensors 74A and 74B, which detect a pressure between the frame 2 and the head of the user, as a detection unit. Even in this case, the operation described with reference to FIGS. 5 and 6 is performed to detect a variation in the position of the frame 2 and to perform adjustment of a display position in correspondence with the variation in the position. According to this, even in a case where the position of the frame 2 deviates, it is possible to allow the user to view the AR contents in a satisfactory manner.

The head-mounted type display device 100B of the second embodiment can detect a variation in the position of the frame 2 by using the nose side pressure sensors 73A and 73B and the ear side pressure sensors 74A and 74B. According to the configuration of the head-mounted type display device 100B, and the method of controlling the head-mounted type display device 100B, as is the case with the head-mounted type display device 100 of the first embodiment, it is not necessary to provide a configuration of directly observing the eyes of the user. Accordingly, in comparison to a case where a camera and the like, which have restrictions on an installation position, are provided in a limited area of the frame 2, it is not necessary to have a complicated structure, and thus it is less likely to receive structural restrictions. According to this, it is possible to implement the device configuration of the head-mounted type display device 100B as a simple configuration. In addition, for example, in a case where the frame 2 is miniaturized, or is configured as a thin frame, the head-mounted type display device 100B is excellent when considering easiness of implementation.

Third Embodiment

Figure 9:
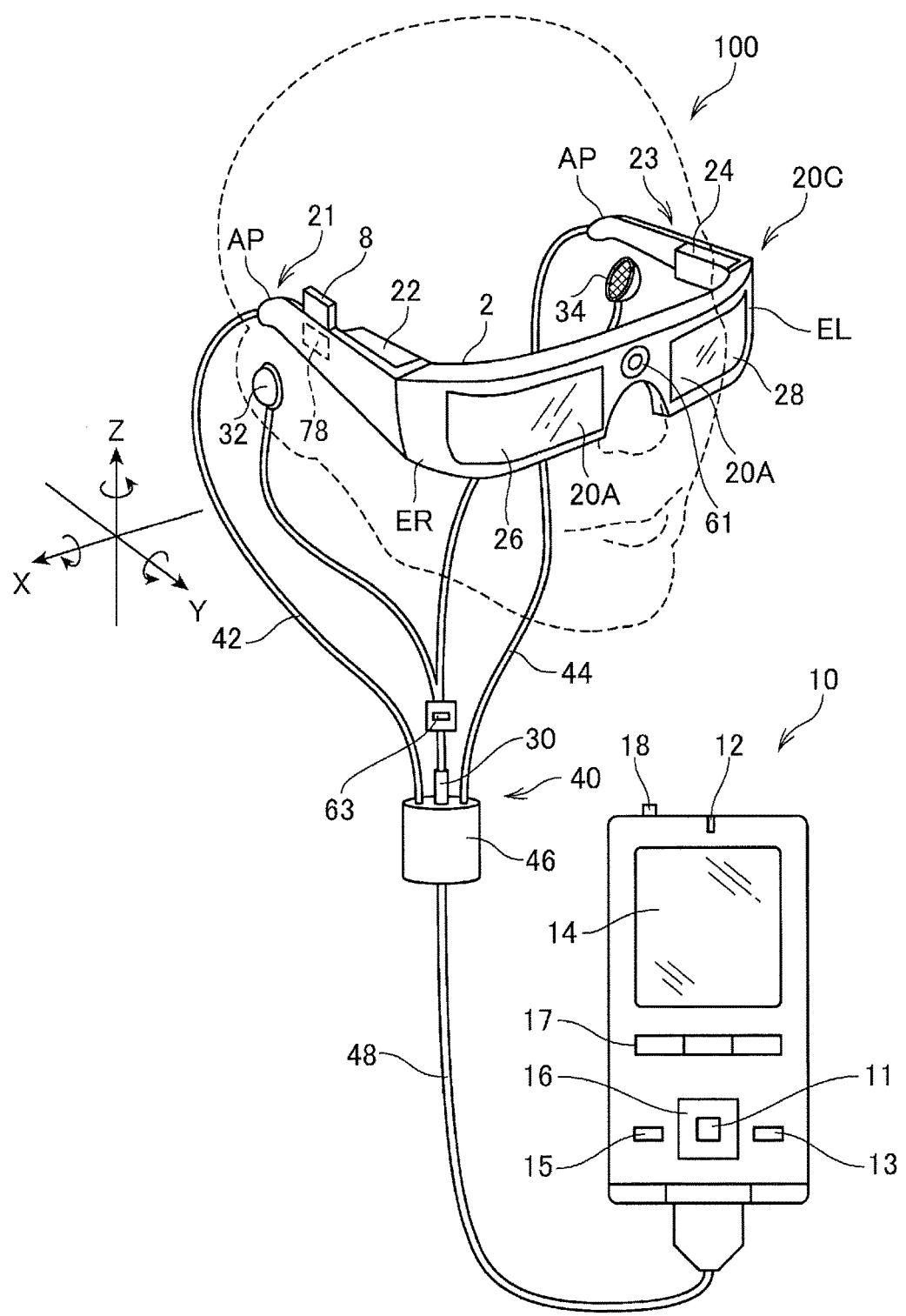
FIG. 9 is a view illustrating an external appearance configuration of a head-mounted type display device according to a third embodiment.
Figure 10:
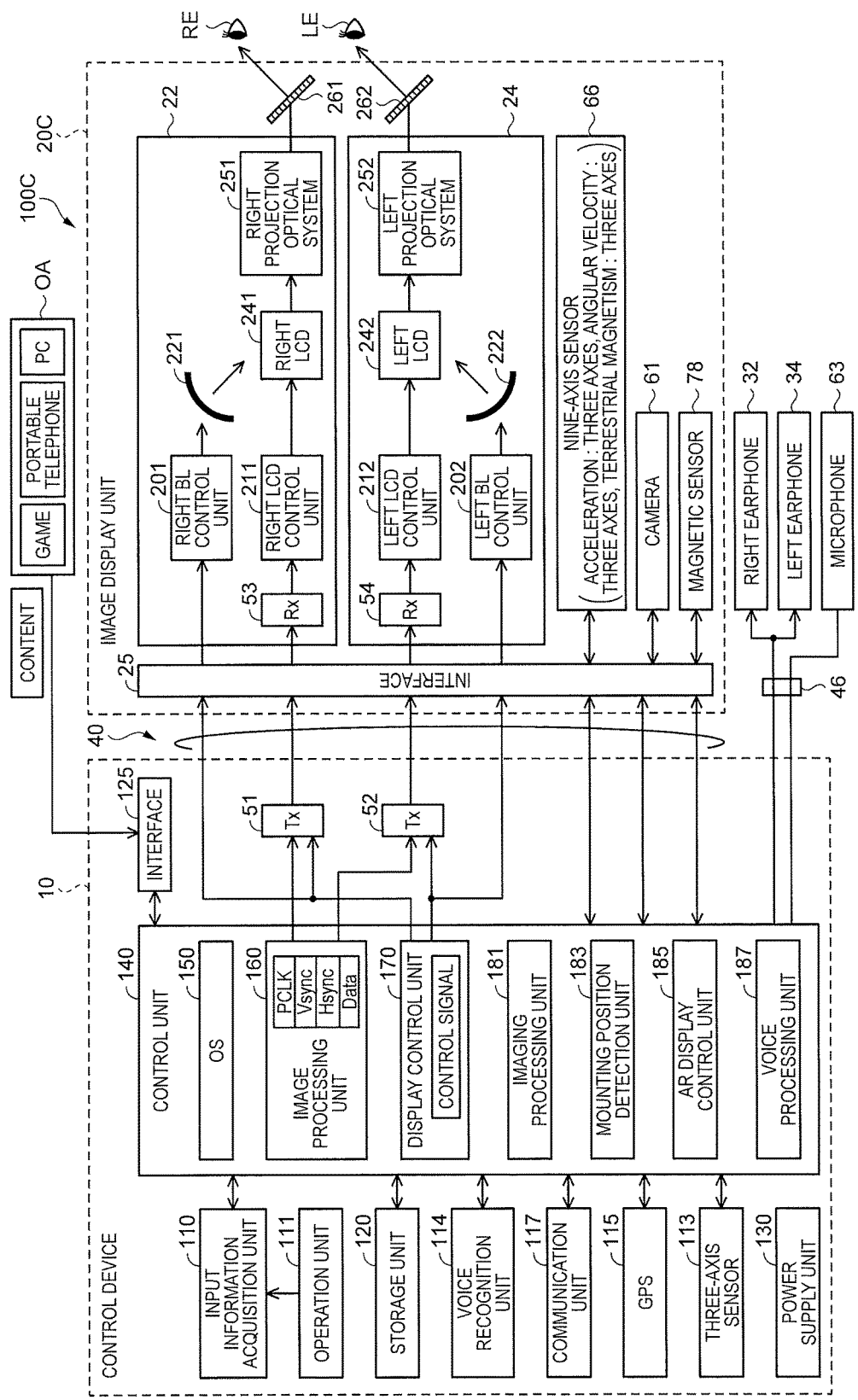
FIG. 10 is a functional block diagram of respective units which constitute the head-mounted type display device of the third embodiment.

FIG. 9 is a view illustrating an external appearance configuration of a head-mounted type display device 100C (display device) according to a third embodiment. In addition, FIG. 10 is a functional block diagram of respective units which constitute the head-mounted type display device 100C of the third embodiment.

The head-mounted type display device 100C of the third embodiment includes an image display unit 20C instead of the image display unit 20. The image display unit 20C has a configuration in which a magnetic sensor 78 is provided instead of the nine-axis sensor 66 of the image display unit 20. In addition, in the head-mounted type display device 100C, a magnetic substance 8 is mounted on the head of the user instead of the head side sensor 71 illustrated in FIG. 1. With regard to respective units, the head-mounted type display device 100C has the configuration common to the head-mounted type display device 100 of the first embodiment except for the above-described difference. In the head-mounted type display device 100C, the same reference numerals will be given to the same constituent units which are common to those in the head-mounted type display device 100, and illustration and description thereof will not be repeated.

As illustrated in FIG. 9, the magnetic sensor 78 is embedded in the right holding unit 21 that corresponds to a temple portion of eyeglasses. The magnetic sensor 78 is fixed to the frame 2. In contrast, the magnetic substance 8 is fixed to the head of the user. In a state in which the frame 2 is mounted on the user, the magnetic substance 8 is fixed to a position that corresponds to the magnetic sensor 78. For example, as illustrated in FIG. 9, the magnetic substance 8 is disposed to come into contact with the right holding unit 21 at a position that is close to the magnetic sensor 78. As a method of providing the magnetic substance 8 to the head of the user in a fixed manner, the same method as in the head side sensor 71 can be employed.

The magnetic sensor 78 detects a magnetic field, and outputs a detection value in accordance with the intensity of the magnetic field that is detected. In addition, the magnetic sensor 78 may detect a variation in the magnetic field to output a detection value in accordance with the amount of variation per unit time in the magnetic field that is detected.

For example, the magnetic substance 8 is a permanent magnet, and may be an electromagnet to which power is supplied from the image display unit 20C.

The magnetic substance 8 and the image display unit 20C are freely displaceable or movable with respect to each other. The magnetic substance 8 of this embodiment is configured as an independent member from the image display unit 20C, and is not connected to the image display unit 20C, and thus the image display unit 20C is displaceable without limitation to the position of the magnetic substance 8. The magnetic substance 8 may be configured to be connected to the image display unit 20C. For example, the magnetic substance 8 and the image display unit 20C may be connected to each other with a wire or a string for prevention of missing of the magnetic substance 8, or may be connected to each other with a cable for electrical connection thereof. Even in this case, it is preferable to employ a configuration in which the image display unit 20C is freely displaceable with respect to the magnetic substance 8.

As illustrated in FIG. 10, the magnetic sensor 78 is connected to the control unit 140 through the interface 25. The mounting position detection unit 183 can acquire a detection value of the magnetic sensor 78. In this configuration, the mounting position detection unit 183 constitutes a detection unit in combination with the magnetic sensor 78. These detection units are provided at a position out of a range that is visually recognized by the user through the image display unit 20C.

In FIG. 9, in a case where a relative position between the magnetic substance 8 and the frame 2 varies due to sliding-down of the frame 2 and the like, a distance between the magnetic substance 8 and the magnetic sensor 78 varies. Accordingly, in a case where a detection value of the magnetic sensor 78 varies, a displacement of the magnetic sensor 78 to the magnetic substance 8, that is, the position of the frame 2 with respect to the head of the user varies. According to this, the mounting position detection unit 183 can detect a variation in the position of the frame 2 on the basis of the detection value of the magnetic sensor 78.

In the operation illustrated in FIG. 5 described in the first embodiment, the mounting position detection unit 183 acquires a detection value at the reference time in step S14. In addition, a detection value is acquired in step S20, and the amount of variation in the mounting position of the frame 2 is calculated in step S21 on the basis of the detection value.

The mounting position detection unit 183 acquires a detection value of the magnetic sensor 78 in step S13 and step S20 in FIG. 5. In addition, the mounting position detection unit 183 performs comparison between detection values which are acquired, or arithmetic processing with respect to the detection values which are acquired.

As described above, the head-mounted type display device 100C includes the magnetic sensor 78 as a detection unit, and the magnetic sensor 78 detects a relative position of the image display unit 20C to the head of the user on the basis of a result when the magnetic sensor 78 detects the magnetic substance 8 that is disposed at the head of the user. In this configuration, the operation described with reference to FIGS. 5 and 6 is performed to detect a variation in the position of the frame 2 and to perform adjustment of a display position in correspondence with the variation in the position. According to this, it is possible to detect a variation in the relative position of the image display unit 20C (frame 2) to the head of the user with a simple configuration. Accordingly, even in a case where the position of the frame 2 deviates, it is possible to allow the user to view the AR contents in a satisfactory manner.

In addition, in the third embodiment, the magnetic substance 8 and the magnetic sensor 78 may be provided in an inversed manner. That is, the magnetic sensor 78 may be fixed to the head of the user, and the magnetic substance 8 may be embedded in the frame 2. In this configuration, the detection unit includes the magnetic substance 8, and the head-mounted type display device 100 detects the relative position of the image display unit 20C to the head of the user on the basis of a result when the magnetic sensor 78 disposed at the head of the user detects the magnetic substance 8.

Even in this case, it is possible to detect a variation in the relative position of the image display unit 20C to the head of the user with a simple configuration using the magnetic sensor 78.

The head-mounted type display device 100C of the third embodiment can detects the variation in the position of the frame 2 by using the magnetic substance 8 and the magnetic sensor 78. According to the configuration of the head-mounted type display device 100C, and the method of controlling the head-mounted type display device 100C, as is the case with the head-mounted type display device 100 of the first embodiment, it is not necessary to provide a configuration of directly observing the eyes of the user. Accordingly, in comparison to a case where a camera and the like, which have restrictions on an installation position, are provided in a limited area of the frame 2, it is not necessary to have a complicated structure, and thus it is less likely to receive structural restrictions. According to this, it is possible to realize the device configuration of the head-mounted type display device 100C as a simple configuration. In addition, for example, in a case where the frame 2 is miniaturized, or is configured as a thin frame, the head-mounted type display device 100C is excellent when considering easiness of implementation.

In addition, the invention is not limited to the configurations of the embodiments, and may be carried out in various embodiments in a range not departing from the gist of the invention.

For example, it is possible to employ image display units of other types such as an image display unit, which is mounted similar to a cap, instead of the image display unit 20. In addition, a display unit that displays an image in correspondence with the left eye of the user and a display unit that displays an image in correspondence with the right eye of the user may be provided. In addition, for example, the display device according to the invention may be configured as a head-up display that is mounted on a vehicle such as an automobile and an airplane. In addition, for example, the display device may be configured as a head-mounted display that is embedded in the body protector such as helmet. In this case, a portion that determines a position with respect to the body of the user, and a portion of which a position is determined with respect to the portion can be set as a mounting portion. This is also true of the image display units 20B and 20C.

In addition, in the embodiments, description has been given of a configuration in which the image display unit 20, 20B, or 20C, and the control device 10 are separated from each other, and are connected to each other through the connection unit 40 as an example. However, the invention is not limited to the configuration, and the control device 10, and the image display unit 20, 20B, or 20C may be integrally configured to be mounted on the head of the user.

In addition, as the control device 10, a note-type computer, a tablet-type computer, or a desk-type computer may be used. In addition, as the control device 10, a portable electronic apparatus such as a gaming machine, a portable telephone, a smart phone, and a portable media player, the other dedicated apparatus, and the like may be used. In addition, the control device 10 may be configured to be separated from the image display unit 20, 20B, or 20C, and various signals may be transmitted and received between the control device 10 and the image display unit 20, 20B, or 20C through wireless communication.

In addition, for example, as a configuration of generating image light in the image display units 20, 20B, and 20C, an organic electro-luminescence (organic EL) display and an organic EL control unit may be provided. In addition, as a configuration of generating image light, a liquid crystal on silicon (LCOS, registered trademark), a digital micro mirror device, and the like may be used.

In addition, as an optical system that guides image light to the eyes of the user, it is possible to employ a configuration which is provided with an optical member, through which external light incident to a device from an outer side is transmitted, and in which the external light is incident to the eyes of the user in combination with the image light. In addition, an optical member, which is located in front of the eyes of the user, and overlaps a part or the entirety of the visual field of the user, may be used. In addition, a scanning type optical system, in which laser light and the like is subjected to scanning and is used as the image light, may be employed. In addition, a configuration having only a function, in which the image light is refracted and/or reflected, and is guided toward the eyes of the user, may be used without limitation to a configuration in which the image light is guided inside an optical member.

For example, the invention may be applied to a laser retina projection type head-mounted display. That is, it is possible to employ a configuration in which a light emission unit includes a laser light source, and an optical system that guides the laser light source to the eyes of the user, laser light is incident to the eyes of the user for scanning of a retina so as to form an image on the retina, and thus the image is visually recognized to the user.

In addition, the invention may be applied to a display device which employs a scanning optical system using an MEMS mirror, and uses an MEMS display technology. That is, the display device may be provided with a signal light forming unit, a scanning optical system including the MEMS mirror for scanning of the light emitted from the signal light forming unit, and an optical member on which a virtual image is formed with light that is subjected to scanning by the scanning optical system as a light emission unit. In this configuration, light emitted from the signal light forming unit is reflected from the MEMS mirror, is incident to the optical member, is guided to the inside of the optical member, and reaches a virtual image forming plane. A virtual image is formed on the virtual image forming plane through light scanning by the MEMS mirror, and when the user grasps the virtual image with the eyes of the user, an image is recognized for the user. An optical part in this case may be, for example, a part that guides light through a plurality of times of reflection similar to the right light guiding plate 261 and the left light guiding plate 262 of the embodiments, or a half mirror plane may be used.

In addition, the optical element according to the invention may be an optical part that allows image light to be incident to the eyes of the user without limitation to the right light guiding plate 261 and the left light guiding plate 262 which respectively include the half mirrors 261A and 262A, and specifically, a diffraction lattice, a prism, a holography display unit may be used.

In addition, at least a part of the functional blocks illustrated in FIG. 3, FIG. 8, and FIG. 10 may be implemented by hardware, or may be configured to be implemented by cooperation of hardware and software. That is, there is no limitation to a configuration in which independent hardware resources are arranged as illustrated in FIG. 3, FIG. 8, and FIG. 10. In addition, a program that is executed by the control unit 140 may be stored in the storage unit 120 or a storage device inside the control device 10, or it is possible to employ a configuration in which a program stored in an outside apparatus is acquired through the communication unit 117 or the interface 125, and is executed. In addition, in the configuration of the control device 10, only the operation unit 111 may be formed as a single user interface (UI). In addition, the configuration of the control device 10 may also be provided to the image display unit 20 in a duplication manner. For example, the control unit 140 illustrated in FIG. 3, FIG. 8, and FIG. 10 may be formed in both the control device 10 and the image display units 20, 20B, and 20C. In addition, it is possible to employ a configuration in which a function performed by the control unit 140 provided to the control device 10, and a function performed by the CPU provided to the image display unit 20, 20B, and 20C can be separated from each other.

The entire disclosures of Japanese Patent Applications No. 2014-261729, filed on Dec. 25, 2014, and No. 2015-195599, filed on Oct. 1, 2015 are expressly incorporated by reference herein.

What is claimed is:

1. A display device, comprising:
   a display that is to be mounted on the head of a user to display an image, and has an optical element that transmits external light;
   an inertial sensor that is fixed with respect to the display; and
   one or more processors configured to:
      adjust a display position of an object that is displayed on the display unit on the basis of output of (1) the inertial sensor and (2) an auxiliary inertial sensor that is to be provided to the head of the user,
      store, in a memory, reference data being based on the output of the inertial sensor and the auxiliary inertial sensor, the reference data representing a reference relative position of the display to the head of the user in a state that the display device is calibrated for the user, and
      adjust the display position in the case where a difference between (1) the reference relative position represented by the reference data stored in the memory and (2) a current relative position being based on the current output of the inertial sensor and the auxiliary inertial sensor is equal to or greater than a threshold.

2. A display device, comprising:
   a display that is to be mounted on the head of a user to display an image, and has an optical element that transmits external light;
   a pressure sensor that is fixed with respect to the display and provides output in response to a pressure between a display main body that supports the display and the head of the user; and
   one or more processors configured to:
      adjust a display position of an object that is displayed on the display on the basis of the output of the pressure sensor,
      store, in a memory, reference data being based on the output of the pressure sensor, the reference data representing a reference relative position of the display to the head of the user in a state that the display device is calibrated for the user, and
      adjust the display position in the case where a difference between (1) the reference relative position represented by the reference data stored in the memory and (2) a current relative position being based on the current output of the pressure sensor is equal to or greater than a threshold.

3. A display device, comprising:
   a display that is to be mounted on the head of a user to display an image, and has an optical element that transmits external light;
   a magnetic sensor that is fixed with respect to the display; and
   one or more processors configured to:
      adjust a display position of an object that is displayed on the display on the basis of output of the magnetic sensor sensing a magnetic substance that is to be provided to the head of the user,
      store, in a memory, reference data being based on the output of the magnetic sensor, the reference data representing a reference relative position of the display to the head of the user in a state that the display device is calibrated for the user, and
   adjust the display position in the case where a difference between (1) the reference relative position represented by the reference data stored in the memory and (2) a current relative position being based on the current output of the magnetic sensor is equal to or greater than a threshold.

4. A display device, comprising:
   a display that is to be mounted on the head of a user to display an image, and has an optical element that transmits external light;
   a magnetic substance that is fixed with respect to the display; and
   one or more processors configured to:
      adjust a display position of an object that is displayed on the display on the basis of output of a magnetic sensor that is to be provided to the head of the user, the magnetic sensor sensing the magnetic substance,
      store, in a memory, reference data being based on the output of the magnetic sensor, the reference data representing a reference relative position of the display to the head of the user in a state that the display device is calibrated for the user, and
      adjust the display position in the case where a difference between (1) the reference relative position represented by the reference data stored in the memory and (2) a current relative position being based on the current output of the magnetic sensor is equal to or greater than a threshold.

* * * * *